United States Patent
Uchida et al.

(10) Patent No.: US 8,049,928 B2
(45) Date of Patent: *Nov. 1, 2011

(54) DENSITY CORRECTION OF AN OBJECT COMBINED WITH AN IMAGE

(75) Inventors: Tatsuro Uchida, Kanagawa (JP);
Hiroshi Oomura, Kanagawa (JP);
Yasuhiro Kujirai, Tokyo (JP);
Yoshihiro Takagi, Kanagawa (JP);
Masanori Aritomi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/533,640

(22) Filed: Jul. 31, 2009

(65) Prior Publication Data

US 2009/0303510 A1 Dec. 10, 2009

Related U.S. Application Data

(62) Division of application No. 10/959,370, filed on Oct. 7, 2004, now Pat. No. 7,589,862.

(30) Foreign Application Priority Data

Oct. 10, 2003 (JP) ................................ 2003-352982

(51) Int. Cl.
*G06F 15/00* (2006.01)
*G03F 3/08* (2006.01)
(52) U.S. Cl. ........................................ 358/1.9; 358/518
(58) Field of Classification Search ................... 358/1.1, 358/1.9, 1.14, 1.15, 3, 1, 3.21, 3.28, 3.29, 358/518; 382/100, 167
See application file for complete search history.

(56) References Cited

U.S. PATENT DOCUMENTS

| | | | |
|---|---|---|---|
| 5,197,765 A * | 3/1993 | Mowry et al. | ............ 283/93 |
| 5,297,815 A | 3/1994 | Anderson et al. | |
| 5,788,285 A | 8/1998 | Wicker | |
| 6,000,728 A | 12/1999 | Mowry | |
| 6,417,931 B2 | 7/2002 | Mori et al. | |
| 6,796,730 B2 | 9/2004 | Toda et al. | |
| 2002/0180822 A1 | 12/2002 | Aritomi | |
| 2003/0133158 A1 | 7/2003 | Uchida | |
| 2003/0154323 A1 | 8/2003 | Kujirai | |
| 2003/0160977 A1 | 8/2003 | Nishikawa et al. | |
| 2004/0021311 A1 | 2/2004 | Shimada | |
| 2004/0210680 A1 | 10/2004 | Yamamura et al. | |

FOREIGN PATENT DOCUMENTS

EP 0522827 A1 7/1992

(Continued)

*Primary Examiner* — Gabriel Garcia
(74) *Attorney, Agent, or Firm* — Fitzpatrick, Cella, Harper & Scinto

(57) ABSTRACT

The invention enables people to easily identify a printout image even in the case where the printout image is printed with a tint block image added thereon. More specifically, a physical page that is a printable area of printing paper is divided into areas, an intended document/image is printed in each of these divided areas (logical pages), and a tint block image is printed only in an area that is in this physical page but does not belong to any of the logical pages. Using a fact that a margin is produced in the so-called N-up printing, the tint block image is printed in this margin. Thereby, the tint block image can be printed in a location that will not interfere with whatever printout image to be printed.

13 Claims, 28 Drawing Sheets

| | |
|---|---|
| TYPE OF OBJECT TO BE DRAWN IN TINT BLOCK PRINTING (TEXT/IMAGE) | 2001 |
| INPUT FILE NAME (WHEN IMAGE IS SELECTED) FONT INFORMATION (WHEN TEXT IS SELECTED) | 2002 |
| ORDER OF PRINTING (WATERMARKING/SUPERPOSITION) | 2003 |
| ANGULAR INFORMATION OF DRAWN OBJECT | 2004 |
| COLOR INFORMATION | 2005 |
| INFORMATION AS TO WHETHER FOREGROUND AND BACKGROUND PATTERNS ARE INTERCHANGED | 2006 |
| PATTERN ADDITIONAL INFORMATION OF CAMOUFLAGE IMAGE | 2007 |
| DENSITY INFORMATION ON FOREGROUND PATTERN | 2008 |
| DENSITY INFORMATION OF BACKGROUND PATTERN | 2009 |

FOREIGN PATENT DOCUMENTS

| | | |
|---|---|---|
| JP | 2005-50050 | 2/2000 |
| JP | 2001197297 | 7/2001 |
| JP | 2001238075 | 8/2001 |
| JP | 2002-67548 | 3/2002 |
| KR | 20010111242 | 12/2001 |

* cited by examiner

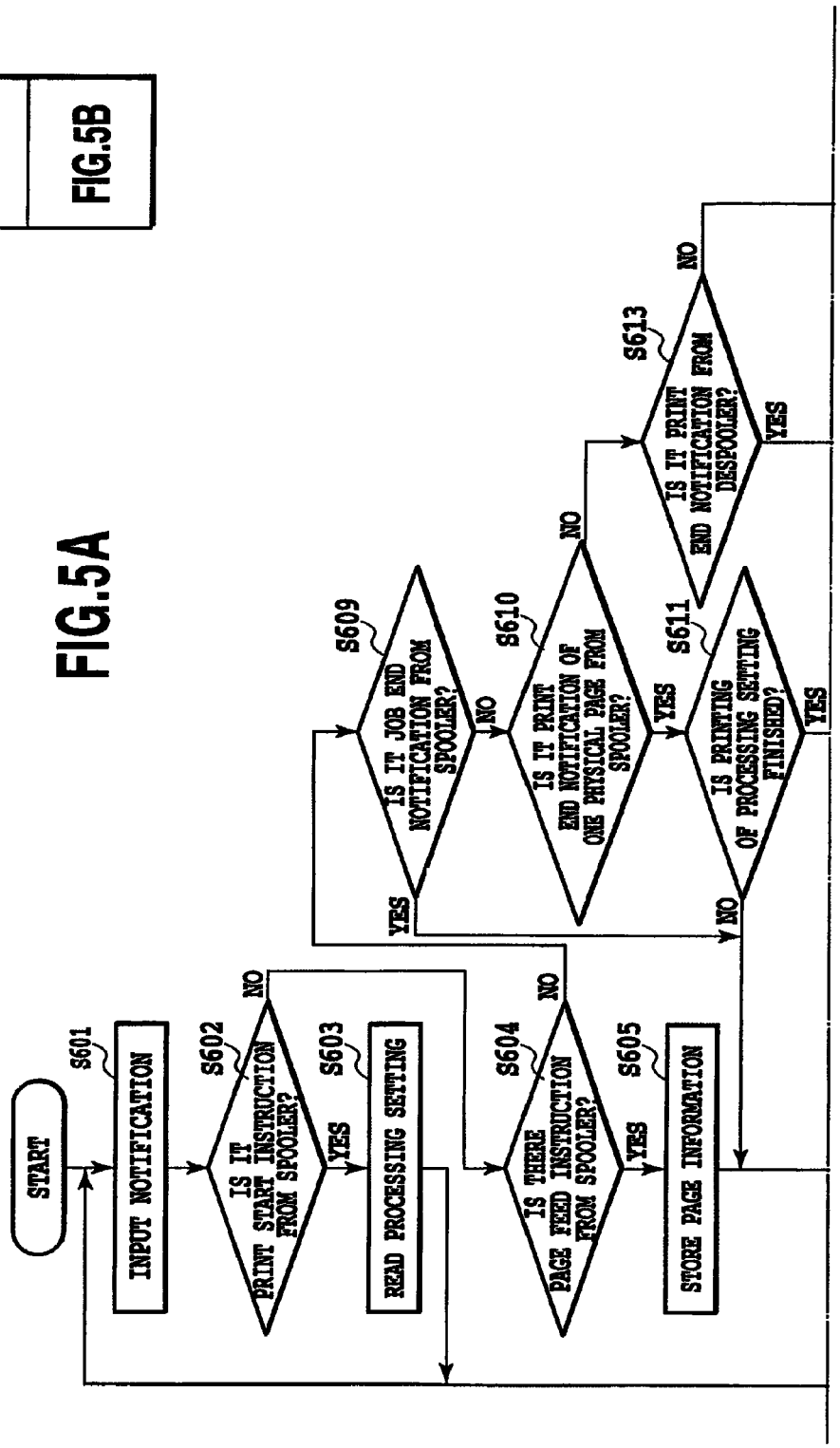

| | |
|---|---|
| DENSITY OF FOREGROUND PATTERN (Df) | 23 |
| DENSITY OF BACKGROUND PATTERN (Db) | 20 |
| DENSITY MARGIN (Dm) | 13 |
| MAXIMUM DENSITY NOT USED IN PRINTING (Dx) | 36 |
| MAXIMUM DENSITY (Dmax) | 255 |

Dx = max(Df,Db) + Dm
D-out = (Dmax- Dx) / Dmax x D-in + Dx

VISUALIZATION

WITHOUT CAMOUFLAGE

WITH CAMOUFLAGE

DENSITY CORRECTION OF AN OBJECT COMBINED WITH AN IMAGE

This application is a divisional application of U.S. patent application Ser. No. 10/959,370, filed Oct. 7, 2004, now U.S. Pat. No. 7,589,862, which is incorporated herein by reference.

BACKGROUND OF THE INVENTION

1. Field of the Invention

The present invention relates to an information processing apparatus and a method for processing information, and more specifically, to processing executed for printing an image including a tint block image, which restrains people from using duplicates and the like, in a system configured by having the information processing apparatus, such as a personal computer, and the printing apparatus, such as a printer.

2. Description of the Related Art

Conventionally, in order to prohibit copying a ledger sheet, a resident card, and the like, or restrain people from doing so, papers on which special printing is given, papers called anti-counterfeit paper have been used. The anti-counterfeit paper is a paper in which characters or the like such as "COPY" is embedded to be hard to recognized by a human eye when the paper is in a state of an original and to show up on the copied paper when the original is copied using a copying machine or the like. Thereby, people can visually distinguish a print sheet as the original from the duplicate made by copying the original, easily. The use of this anti-counterfeit paper as an original causes those who copy the original to hesitate to use duplicated papers. Moreover, the anti-counterfeit paper gives a mental restraint effect of inhibiting an act of copying itself. The reason why characters in the original of the anti-counterfeit paper needs to be hard for people to recognize is to enable people to distinguish between the original and the duplicate definitely. If characters such as "COPY" is recognizable to such an extent that people can clearly recognize it even in the original, there may occur the possibility that people recognize it as the duplicate and such paper does not make a sense as the anti-counterfeit paper. Wicker (U.S. Pat. No. 5,788,285) and Mowry et al. (U.S. Pat. No. 6,000,728) disclose arts for manufacturing such an anti-counterfeiting paper.

However, since the anti-counterfeit paper like this is made by fully employing a special printing technology, it comes with a problem of high cost compared to normal papers. Moreover, the anti-counterfeit paper can make only characters that are set at the time of manufacturing show up. Therefore, an application of the anti-counterfeit paper and characters being set are limited. That is, the conventional anti-counterfeit paper lacks flexibility regarding applications because of a matter on its manufacture.

On the other hand, as various contents are being digitized, the contents of ledger sheets, a resident card, or the like are being transformed into digital data similarly. However, digitization for handling of these ledger sheets and resident cards, such as use of these documents, is still in a transition phase. Consequently, the contents of digital data formed using a computer is likely to be outputted on papers with a printer or the like for subsequent use.

Under such circumstances, significant improvement in printer performance has been achieved in recent years, and this is one of cause for a technology, which makes it possible to print out a paper on demand that has the same effect as the conventional anti-counterfeit paper using a computer and a printer, to attract an attention. Japanese Patent Application Laid-open No. 2001-197297 and Japanese Patent Application Laid-open No. 2001-238075 disclose technologies whereby, when contests data formed using a computer is printed out with a printer, an image called tint block (a copy-forgery-inhibited pattern) is also outputted with superposed on the background of the contents data. The tint block image is an image that is recognized only as a simple pattern or a mere background color in the original (a printed matter outputted by a printer) to the human eye, but, when it is copied, will show up as predetermined characters or the like in the duplicate. Thereby, the same restraint effect as the anti-counterfeit paper can be given to those who copied.

In the case that the contents are printed out together with a tint block image generated by a computer, being superposed thereon, naturally a normal printing paper or the like can be used. Therefore, this technology has an advantage in terms of cost in comparison with the technology using the anti-counterfeit paper. Moreover, the tint block image can be generated when the contents are outputted by printing. Thereby, characters or the like that will be made visible at the time of copying can be set freely. Further more, there is also an advantage that dynamic information, such as a user name who executed printing and printout time and date, can be made to show up as the characters.

The tint block image, as discussed above, is one that, when being duplicated, visualizes a predetermined character or the like that could not be recognized before duplication, therefore restrains people from using the duplicate, and realizes an effect of enabling people to visually identify what the people sees to be the duplicate, in other words, not to be the original easily. In order to realize this effect, the tint block image is basically composed of two areas: an area which remains (shows up) in the duplicate when being copied, and an area which disappears in the duplicate or becomes too light-colored to recognize compared to the image remaining area. These two areas, as being printed, are of almost the same density, and therefore no one can recognize that characters etc., such as "COPY" that will become visible by duplication are hidden (embedded) therein at first sight, in a macroscopic sense. However, in a microscopic sense, for example, in a level of printed dots, these two areas have different characteristics, respectively, as will be shown below.

Hereafter, an image that will show up by duplication is called a "latent image" and an image that will disappear or become light-colored is called a "background" for convenience. The tint block image is basically composed of the latent image and the background image. Moreover, there is a case where the tint block image also includes a below-mentioned camouflage image. Incidentally, there may be a case where the latent image is called a foreground as a term related to a user interface.

Note that tint block printing is not limited to the above-mentioned composition, and the tint block image may be composed in such a way that characters, such as a "COPY", a logo, or a pattern will be rendered (will become visible) as an recognizable image to the human eye in the duplicate. That is, even if the characters "COPY" are rendered as outlined characters in the duplicate, it will achieve its object as tint block printing. In this case, needless to say, the characters of "COPY" are generated as a background image.

Now, in the case of dot printers, such as of electro-photographic and ink jet systems, an area which will remain in the duplicate (latent image section or foreground section) consists of sets of concentrated dot masses. The area which will disappear or be reproduced with thinner density (background section) than the image density in the area which will remain consists of sets of dispersed dots. Moreover, in a state where the tint block image is printed, the density of the whole tint block image can be made almost uniform by setting the images in such a way as to have almost equal density in respective areas.

FIG. 24 is a view showing these two areas. As shown in this figure, the tint block image is composed of both the background section in which dots are arranged dispersedly and the latent image section in which concentrated dot masses are arranged. These two areas can be generated by mutually different half tone dot processing and dither processing. In the case where the tint block image is generated using the half tone dot processing, half tone dot processing with a small number of lines is suited for the latent image and that with a large number of lines is suited for the background section. In the case where the tint block image is generated using dither processing, dither processing using a dot concentration type dither matrix is suitable for the latent image section, and dither processing using a dot dispersion type dither matrix is suitable for the background section.

Generally, the copying machine has critical points in reproducing capability that depends on input resolution of reading fine dots of a manuscript and output resolution of reproducing fine dots. In the case where the dot in the background section of the tint block image is formed smaller than the critical point of dots that the copying machine can reproduce and the dot masses in the latent image section thereof are formed larger than the critical point, an image composed of larger dot masses of the tint block image is reproduced and an image composed of smaller dots is not reproduced, in the duplicate by copying. As a result, the latent image will be made visible. Moreover, even in the case where dispersed small dots are not completely disappeared by copying, i.e., in the case where the density of the background section is low compared to that of concentrated dot masses, relatively the latent image can be recognized more markedly.

FIGS. 25A and 25B are views showing visualization of a latent image. FIG. 25A is a view corresponding to a state where the tint block image is printed. FIG. 25B is view corresponding to a duplicate obtained when FIG. 25A was copied by a copying machine. From FIG. 25A and FIG. 25B, it may be understood that the latent image by the concentrated dot masses will show up and the background by the dispersed dots will disappear.

Further, it is also known well that a technique called the "camouflage" for making it difficult to recognize a latent image embedded in the original is applied to the tint block image. The camouflage is a technique of arranging a pattern whose density is differentiated from those of the latent image section and the background section to be superposed on the tint block image. The tint block image to which the camouflage is applied has an effect that the camouflage image whose density is different from those of the latent image section and the background section becomes noticeable and the latent image section becomes further less noticeable. Moreover, the camouflage image has an effect of giving a decorative impression to a printed matter.

FIG. 26A shows a tint block image to which no camouflage image is given. FIG. 26B shows a tint block image to which a camouflage image is given. In order to make it easy to recognize a visualized latent image in the duplicate after duplication, it is desirable that dots constituting the camouflage image are made not to be reproduced in the duplicate. This can be realized by, for example, drawing the camouflage image as an outlined image, as shown in FIG. 26B.

PCT Publication No: WO 01/94122 A1, also published as US 2004/0021311, discloses using a tint block image. However, WO 01/94122 A1 only discloses adding the tint block image to an object image and does not disclose that a density of the object image is corrected upon combining the tint block image and the object image. Therefore, a printed result intended by a user can not be obtained.

SUMMARY OF THE INVENTION

In one aspect of the invention, a density correction apparatus for an object, when generating data for printing a tint block image, which is different data from data for the object and is composed of two areas, one of the two areas remaining in a duplicate when being copied and the other of the two areas disappearing in the duplicate or becoming too light-colored to recognize compared to the area remaining in the duplicate, and the object in a superposed manner upon the tint block image, corrects the density of the object in accordance with the tint block image, wherein the density of a printed image, which is made by printing the object whose density has been corrected and the tint block image in a superposed manner, is higher than a density of the tint block image in the printed image.

In another aspect of the present invention, there is provided an information processing apparatus comprising print data generating means for generating a first image for printed out and a second image including a latent image and a background image, wherein the print data generating means arranges the first image on a first area of a printable area of a printing medium and the second image on a second area other than the first area, of the printable area, and generates the print data so that the second image arranged on the first area is different from the second image arranged on the second area.

In another aspect of the present invention, there is provided an information processing apparatus comprising print data generating means for generating a first image for printed out and a second image including a latent image and a background image, wherein the print data generating means corrects a density value of the first image based on a maximum density value of the second image for generating print data, so that the density value of the first image is within a density range greater than the density value that is greater than the maximum density of the second image by a predetermined value.

In another aspect of the present invention, there is provided an information processing method comprising print data generating step for generating a first image for printed out and a second image including a latent image and a background image, wherein the print data generating step arranges the first image on a first area of a printable area of a printing medium and the second image on a second area other than the first area, of the printable area, and generates the print data so that the second image arranged on the first area is different from the second image arranged on the second area.

In another aspect of the present invention, there is provided an information processing method comprising print data generating step for generating a first image for printed out and a second image including a latent image and a background image, wherein the print data generating step corrects a density value of the first image based on a maximum density value of the second image for generating print data, so that the density value of the first image is within a density range greater than the density value that is greater than the maximum density of the second image by a predetermined value.

According to the above configuration, in the case of controlling such printing that there are a first area in which an image to be printed out is printed and a second areas other than the first area in the printable area of a printing medium, such as reduction printing and N-up printing, printing modes for the first area and for the second area are differentiated.

Therefore, a tint block image that will not interfere with an image to be printed can be printed in the first area. For example, a mode where the tint block image is not printed in the first area can be adopted. Alternatively, a mode where although a tint block image is printed in the first area, the tint block image that will not interfere with an image to be printed is generated according to the image to be printed, so that the tint block image is different from a tint block image in the second area, can be adopted.

Moreover, in another form of the present invention, since considering the maximum density of the tint block image to be printed, the image is printed in a density range higher than that maximum density by a predetermined value, the image to be printed can be distinguished from a tint block image by the density difference. Moreover, even in an area where the tint block image and the image to be printed are printed in an over lapping manner, the contents of the printed image can be clearly recognized.

Therefore, even in the case where printing of a tint block image is performed, it becomes possible to identify the print-out image easily.

The above and other objects, effects, features and advantages of the present invention will become more apparent from the following description of embodiments thereof taken in conjunction with the accompanying drawings.

DETAILED DESCRIPTION OF PREFERRED EMBODIMENTS

Hereafter, embodiments of the present invention will be described in detail with reference to the drawings.

FIG. 1 through FIG. 19 are views explaining configurations related to print processing and generation of basic drawing data of the tint block image (the copy-forgery-inhibited pattern) accompanying it in a system comprising a host computer that is information processing apparatus and a printer that is printing equipment, according to one embodiment of the present invention.

Note that, in this embodiment, part that will become visible in the duplicate at the time of copying is called a latent image section or a foreground section. Part that will disappear or become light-colored compared to the latent image section in the duplicate at the time of copying is called a background section. And text information, such as "COPY" and "VOID", is included in the latent image section. However, a tint block image according to the present invention is not limited to them. The text information may be in such a form as is represented (visualized) as outlined characters to a surrounding image in the duplicate. In this case, it is understood that a relationship of concentration and dispersion of dots between the latent image section and the background section will become in inverse relation to a relationship for not-outlined characters. The present invention is not prescribed by the kind of tint block image, generating process, color, form, size, etc.

Configuration of Printing System

Figure 1:
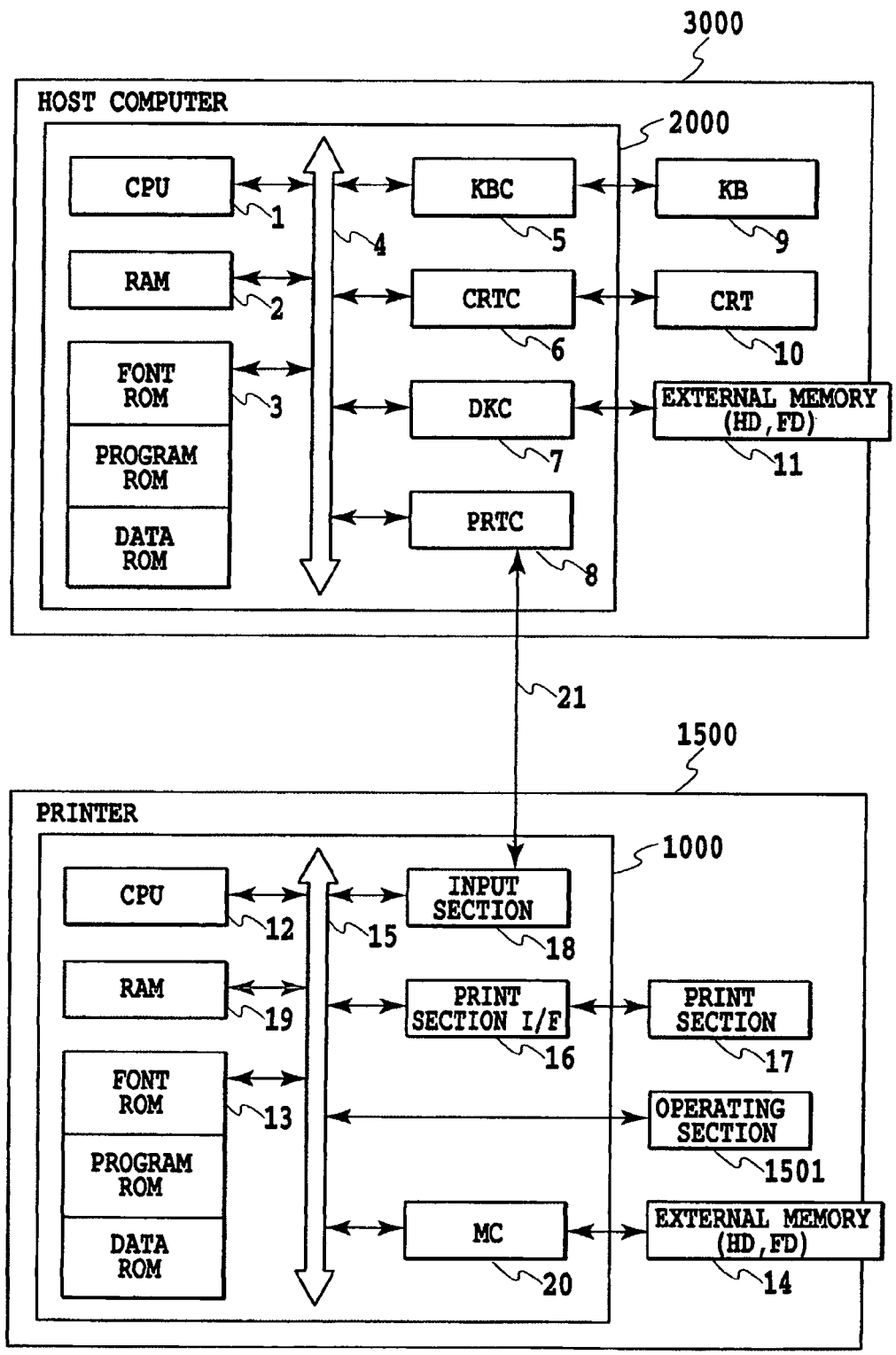
FIG. 1 is a block diagram showing a configuration of a printing system according to the embodiment of the present invention.

FIG. 1 is a block diagram showing a configuration of a printing system according to the embodiment of the present invention. The present invention can be applied to any of a single device, a system comprising a plurality of devices, and a system that is connected to other device/system through a network, such as LAN and WAN, and performs processing, provided that the functions of the present invention are performed.

In this figure, the host computer 3000 is equipped with CPU 1 that controls execution of processing of a document, in which diagrams, images, characters, tables (including table calculation etc.), etc. are mixed, and which includes processing related to embodiments of the present invention that will be described later with reference to FIG. 20 and thereafter, according to a document processing program stored in program ROM of ROM 3 or in external memory 11, and execution of the print processing based on the document processing. The CPU 1 supervises controls of devices connected to system bus 4. Program ROM of the ROM 3 or the external memory 11 stores the operating system (hereinafter referred to as OS) that is a control program of the CPU 1 etc. Either font ROM of the ROM 3 or the external memory 11 stores font data used in the document processing etc. Data ROM of the ROM 3 or the external memory 11 stores various data used in performing the document processing etc. RAM 2 functions as main memory, a work area, etc. for the CPU 1.

A keyboard controller (KBC) 5 controls key input from a keyboard 9 and a pointing device (not shown). A CRT controller (CRTC) 6 controls displaying by a CRT display (CRT) 10 including displaying of a tint block image. Reference numeral 7 denotes a disk controller (DKC), which controls access to the external memory 11, such as a hard disk (HD) that stores a boot program, various applications, font data, user files, edit files, a printer control command generating program (hereinafter referred to as a printer driver), a floppy (registered trademark) disk (FD), etc. A printer controller (PRTC) 8 is connected to a printer 1500 through a bidirectional interface (interface) 21 to execute control processing of communication with the printer 1500.

The CPU 1 performs, for example, a process of spreading (rasterization) outline fonts onto display information RAM being set on the RAM 2, which enables WYSIWYG on the CRT 10. Moreover, the CPU 1 opens various windows previously registered in response to a command directed by an unillustrated mouse cursor etc. on the CRT 10 and performs various data processing. When performing printing, the user can open a window for printing setting and set a print processing method for the printer driver including setting of a printer and selection of a print mode.

The printer 1500 is controlled by CPU 12 installed in the printer 1500. The printer CPU 12 outputs image signals as printout information to a printing section (printer engine) 17 connected to system bus 15 based on a control program stored in the program ROM of ROM 13 etc. or a control program stored in external memory 14 etc. Moreover, this program ROM of the ROM 13 stores a control program of the CPU 12 etc. The font ROM of the ROM 13 stores font data used in generating the printout information etc. The data ROM of the ROM 13 stores information to be used in the host computer etc. in the case where the printer does not have the external memory 14, such as a hard disk.

The CPU 12 is capable of communication processing with the host computer through an input section 18, and can notify the host computer 3000 of information of the printer etc. The RAM 19 is RAM that functions as main memory, a work area, etc. of the CPU 12, and is configured to be able to expand memory capacity by means of optional RAM connected to an expansion port not shown in the figure. Incidentally, the RAM 19 is used for an output information spreading area, an environmental data storing area, NVRAM, etc. Access of the external memory 14, such as hard disk (HD) and IC card mentioned above, is controlled by a memory controller (MC) 20. The external memory 14 is connected as an option, and stores font data, an emulation program, form data. etc. Reference numeral 1501 denotes the operation panel mentioned above, on which switches, an LED display, etc. are placed.

The above-mentioned external memory 14 is not limited to one. Two or more pieces of external memory 14 may be installed and be configured so that an option card in addition to an internal font and an external memory that stores a program for interpreting a printer control language belonging to a different language system can be connected. Moreover, the memory may have NVRAM not shown in the figure and may be configured so as to store printer-mode setting information through the operation panel 1501.

The printing section 17 is equipped with an engine of the electro-photography method in this embodiment. Therefore, the image and accompanying tint block image are printed by means of dots of toner that are formed according to their print data. Note that, in applying the present invention, naturally the method of printing is not limited to the electro-photography method like this. For example, the present invention can be applied to printing equipment of any method whereby printing is done by forming dots, such as the ink jet method.

Figure 2:
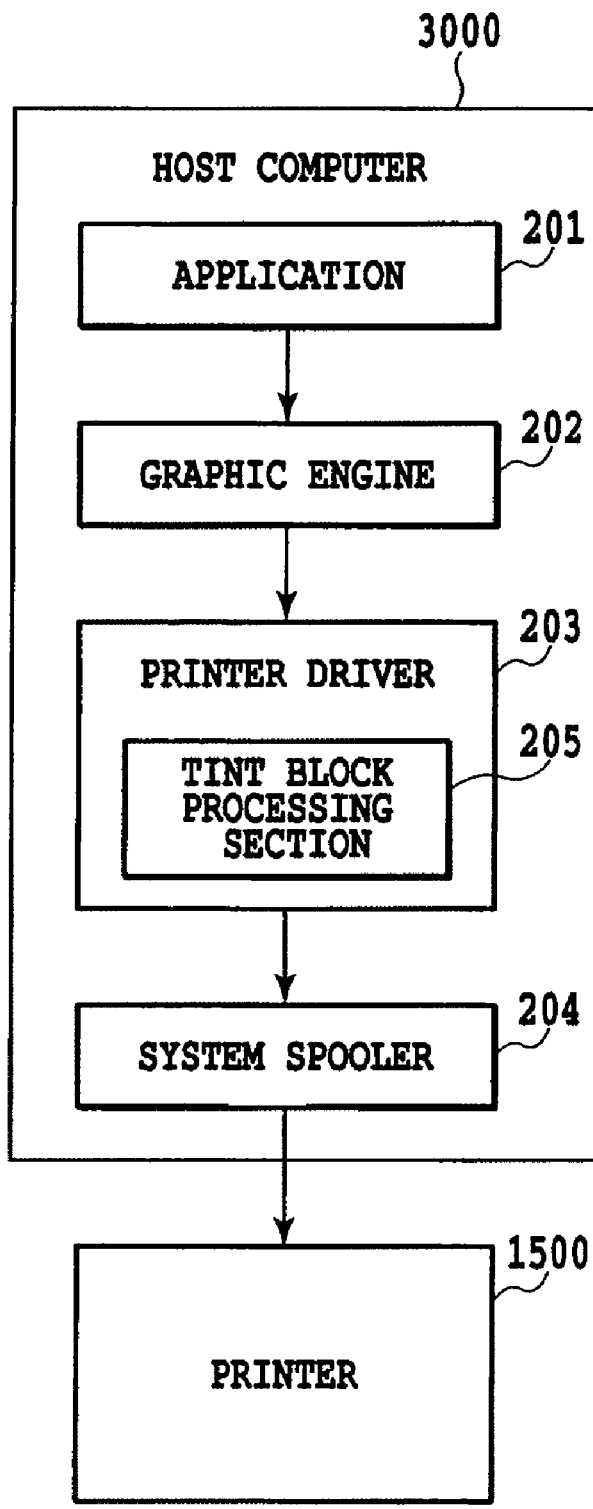
FIG. 2 is a view showing a configuration for print processing in a host computer 3000 shown in FIG. 1.

FIG. 2 is a view showing one configuration for print processing in the host computer 3000 shown in FIG. 1. An application 201, a graphic engine 202, a printer driver 203, and a system spooler 204 exist as files stored in the external memory 11, and each of them is a program module that is loaded into the RAM 2 and executed by the OS or a module using the module when being executed. Moreover, the application 201 and the printer driver 203 can be added to an FD of external memory, unillustrated CD-ROM, or an HD of the external memory 11 through an unillustrated network. The application 201 stored in the external memory 11 is loaded into the RAM 2 and executed. When this application 201 makes the printer 1500 execute printing, the application performs outputting (drawing) using the graphic engine 202 that is loaded similarly into the RAM 2 to be executable.

The graphic engine 202 loads similarly the printer driver 203 prepared for each printing apparatus, such as a printer, into the RAM 2 from the external memory 11, and sets the output of the application 201 in the printer driver 203. Then, it converts the GDI (Graphic Device Interface) function received from the application 201 into the DDI (Device Driver Interface) function, and outputs the DDI function to the printer driver 203.

The printer driver 203 converts the output of the application into a control command recognizable to the printer, for example, PDL (Page Description Language), based on the DDI function received from the graphic engine 202. The printing system is configured so that the control command obtained by the conversion goes through the system spooler 204 loaded into the RAM 2 by the "OS," and is outputted to the printer 1500 through an interface 21 as print data.

The printing system of this embodiment has a tint block processing section 205 in the printer driver 203. The tint block processing section 205 may be a built-in module of the printer driver 203, or may be in the form of a library module that is added by individual installation. Moreover, the printer driver 203 executes later-described command generation of the tint block image regarding the printing of the tint block image by calling the tint block processing section 205 into action.

Moreover, a tint block layer determination section 308 (see FIG. 3) is a module provided in the tint block processing section 205, and performs an automatic determination process of the order of printing of the tint block image in the second embodiment.

Printing-related Software Module

Figure 3:
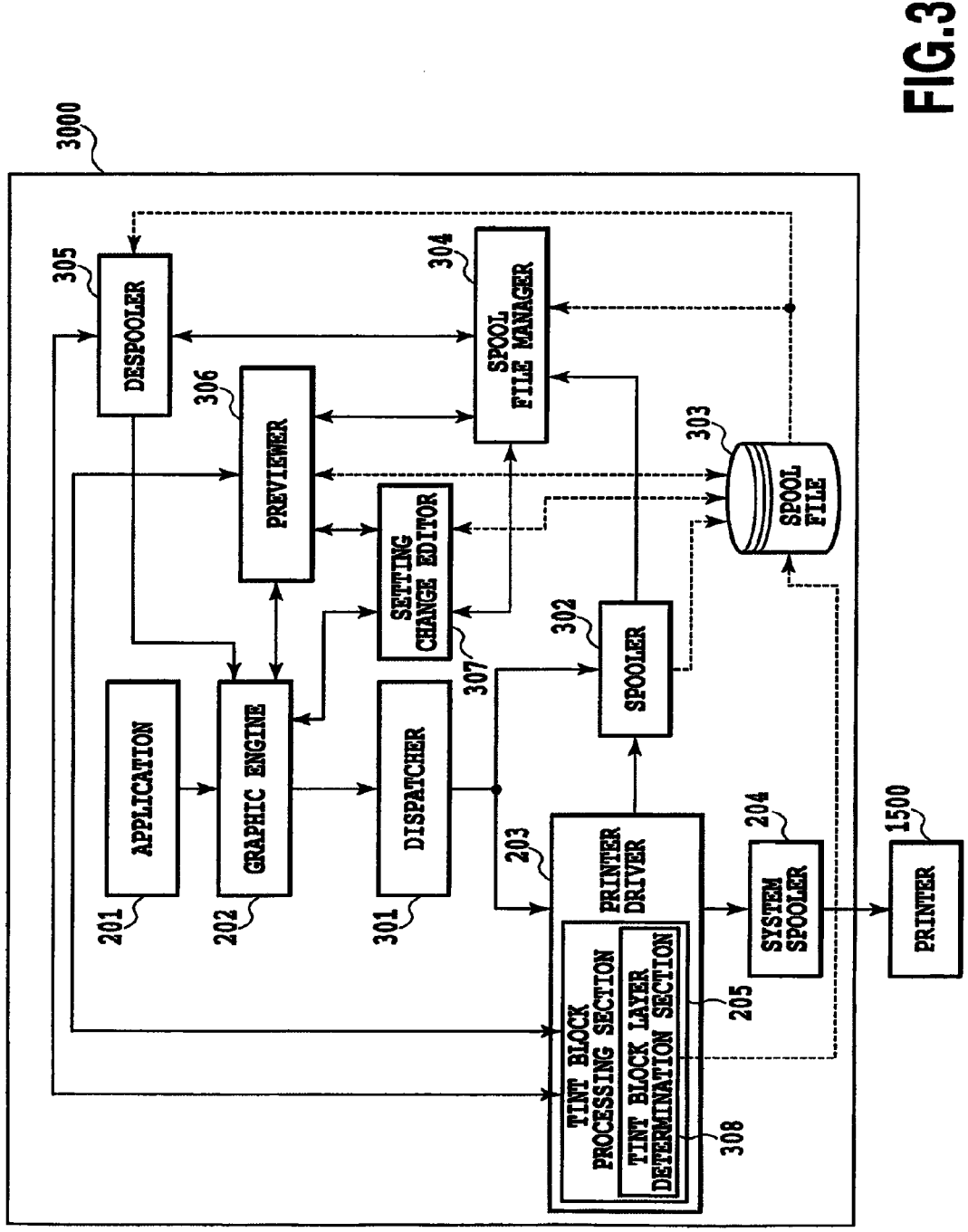
FIG. 3 is a block diagram showing another example of a configuration for print processing in the host computer 3000, this configuration being expanded from the configuration shown in FIG. 2.

FIG. 3 is a block diagram showing a configuration that is an expansion of the configuration shown in FIG. 2, relating to another example of a configuration for print processing in the host computer 3000. This configuration is a configuration in which when a print instruction is sent to the printer driver 203 from the graphic engine 202, a spool file 303 made of an intermediate code is generated temporarily. In the configuration of FIG. 2, the time when the application 201 is released from the print processing is the time when the printer driver 203 has converted all print instructions from the graphic engine 202 into control commands of the printer. In contrast to this, in the configuration of FIG. 3, the time of release is the time when the spooler 302 has converted all the print instructions into intermediate code data, and outputted it to the spool file 303. Usually, the latter finishes in a shorter time. Moreover, the configuration shown in FIG. 3 allows the contents of the spool file 303 to be processed. Thereby, for print data from the application, functions that the application does not possess, such as enlargement, size reduction, printing two or more pages in one page by reducing their sizes, can be realized.

For these purposes, the configuration of FIG. 2 is subjected to system expansion so that spooling is performed with the intermediate code data as shown in FIG. 3. Here, in order to process the print data, normally the user should perform setting through the window presented by the printer driver 203, and the printer driver 203 stores the contents of setting in the RAM 2 or in the external memory 11.

Details of the configuration shown in FIG. 3 will be described below. As shown in this figure, in this expanded processing method, a dispatcher 301 receives the DDI function that is a print instruction from the graphic engine 202. If the print instruction (DDI function) that the dispatcher 301 received from the graphic engine 202 is one that is based on the print instruction (GDI function) that the application 201 issued to the graphic engine 202, the dispatcher 301 loads the spooler 302 stored in the external memory 11 into the RAM 2 and sends the print instruction (DDI function) to the spooler 302, not to the printer driver 203.

The spooler 302 analyses the received print instruction, transforms it into the intermediate code for each of pages, and outputs it to the spool file 303. This spool file of the intermediate code stored in units of page is called a page description file (PDF: Page Description File). Moreover, the spooler 302 acquires processing setting (N-up, double face printing, stapling, color/monochrome specification, etc.) regarding print data that is being set for the printer driver 203 from the printer driver 203, and stores it in the spool file 303 as a file in units of job. This setting file stored in units of job is called a job setting file (often called SDF in short: a spool description file). This spool description file will be described later. Note that the spool file 303 is generated in the external memory 11 as a file, but may be generated in the RAM 2. Furthermore, the spooler 302 loads a spool file manager 304 stored in the external memory 11 into the RAM 2, and notifies the spool file manager 304 of a generation situation of the spool file 303. Then, the spool file manager 304 determines whether printing can be performed according to the contents of the processing setting on the print data stored in the spool file 303.

If the spool file manager 304 determines that printing could be performed using the graphic engine 202, it loads the despooler 305 stored in the external memory 11 into the RAM 2. Then, the spool file manager 304 directs the despooler 305 to perform a control command generating process based on the page description file of the intermediate code described in the spool file 303.

The despooler 305 processes the page description file of the intermediate code included in the spool file 303 according to the job setting file including processing setting information contained in the spool file 303 to regenerate the GDI function, and outputs the GDI function through the graphic engine 202 again. In doing so, for generation of a command related to printing of the tint block image, the tint block processing section 205 is loaded to perform the processing.

If the print instruction (DDI function) that the dispatcher 301 received from the graphic engine 202 is one that is based on the print instruction (GDI function) issued by the despooler 305 to the graphic engine 202, the dispatcher 301 sends the print instruction to the printer driver 203, not to the spooler 302. The printer driver 203 generates a printer control command made of a page description language etc. based on the DDI function obtained from the graphic engine 202, and outputs it to the printer 1500 through the system spooler 204.

Further, FIG. 3 shows an example in which a previewer 306 and a setting change editor 307 are placed in addition to the expansion system mentioned above, so that preview including preview of the tint block image, printing setting change, and binding of two or more jobs are made possible. In order to make the system perform the print preview, the printing setting change, or the binding of two or more jobs, it is necessary for the user to first specify "Store" in a pull-down menu 901 that is means for executing "Specification of output destination" in the property of the printer driver shown in FIG. 8. Incidentally, if the user only wishes to see preview, it can also be done by selecting "Preview" as specification of output destination.

The contents being set up in the property of the printer driver in this way are stored in the structure (called DEVMODE in Windows (registered trademark) OS) that the OS provides as a setting file. The structure contains, for example, setting as to whether storing in the spool file manager 304 is performed in the processing setting kept in the spool file 303. When the spool file manager 304 has read the processing setting through the printer driver and a specification of storage has been made, the page description file and the spool description file are generated and stored in the spool file 303 as described above. Moreover, a window screen of the spool file manager is popped up to display a list of jobs spooled in the spool file 303.

If preview of a certain single job or a combined job is specified on the window screen of the spool file manager, the previewer 306 stored in the external memory 11 is loaded into the RAM 2, and the previewer 306 is instructed to perform preview processing of the job in the intermediate code described in the spool file 303.

Storage Processing of Intermediate Print Data

Figure 4:
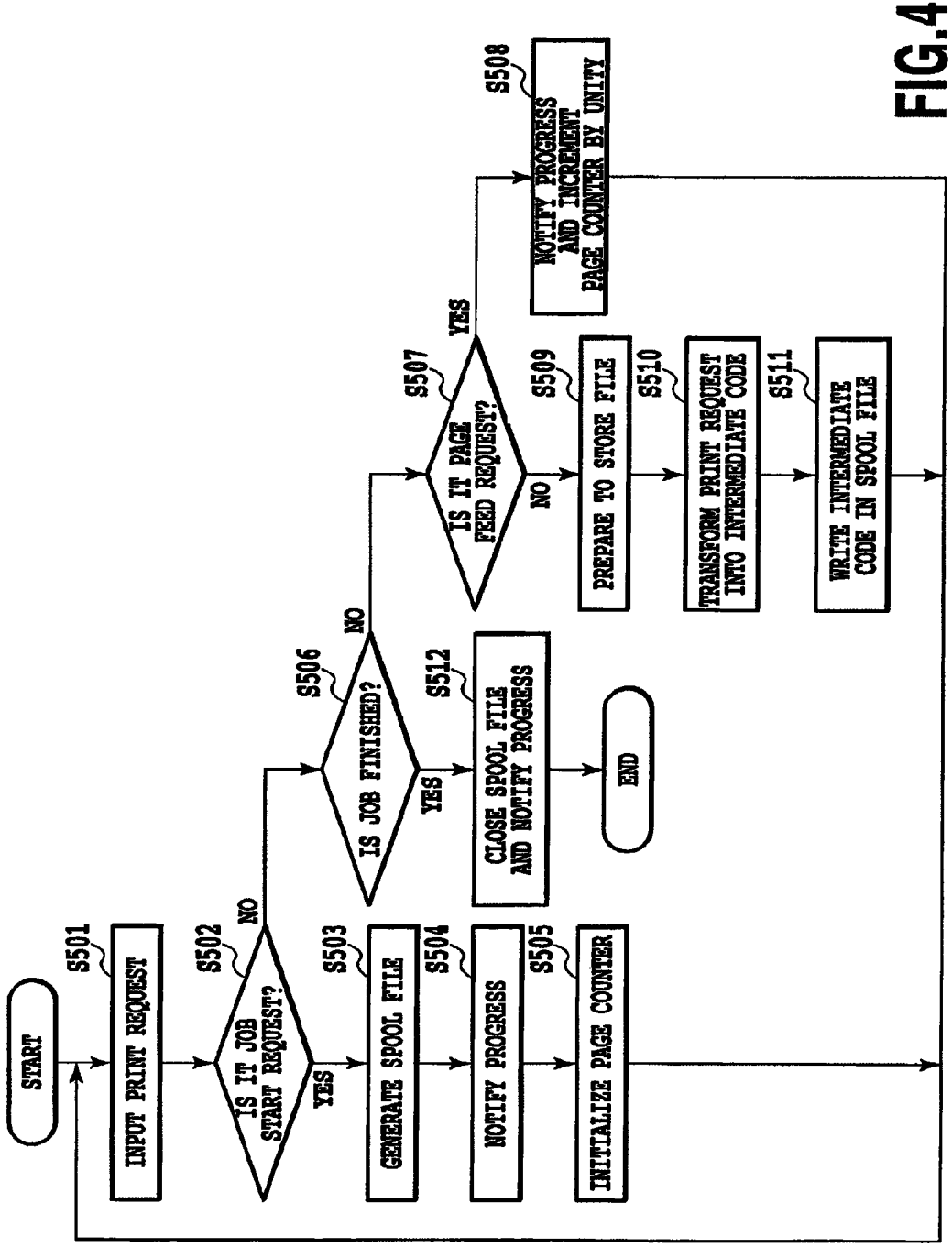
FIG. 4 is a flowchart showing processing of a saving step in units of page in a spooler 302 generating a spool file 303.

FIG. 4 is a flowchart showing processing of a storing step for a unit of page in the spooler 302 generating the spool file 303.

Figure 7:
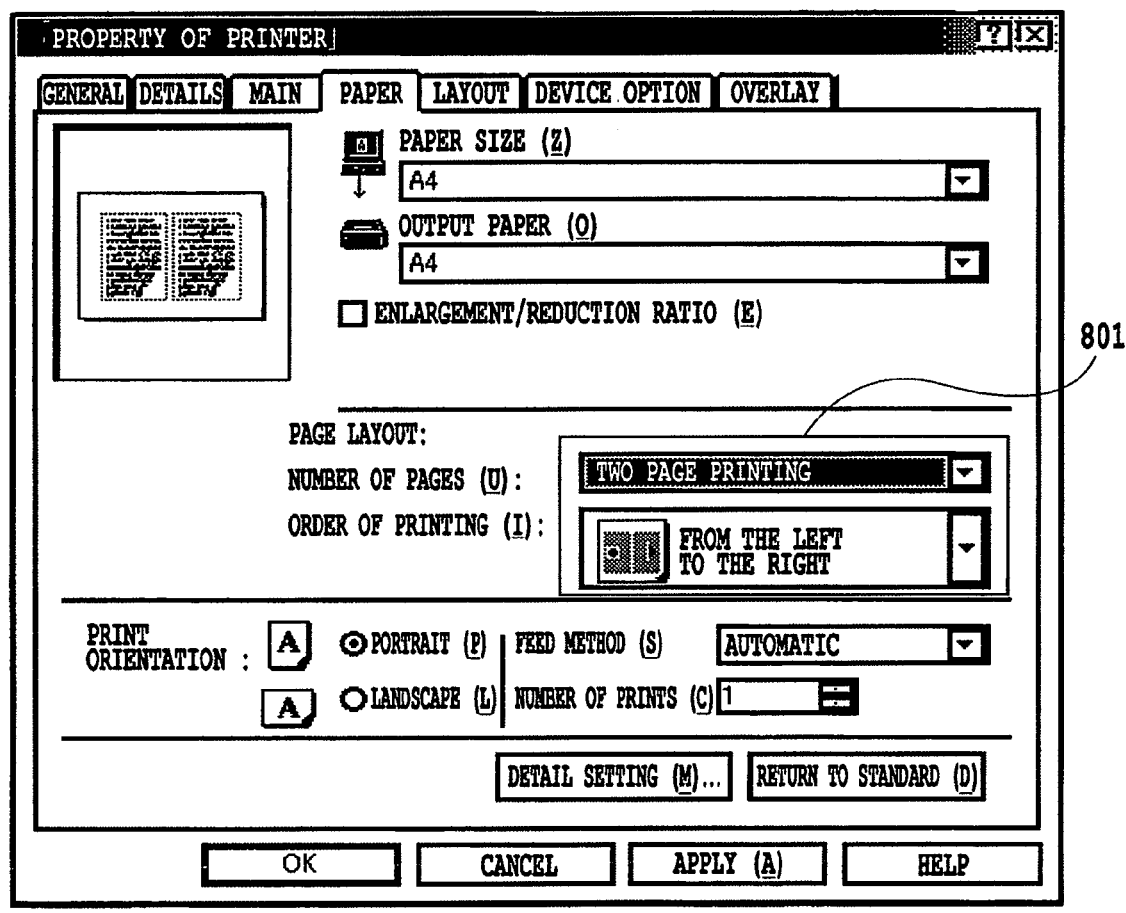
FIG. 7 is a view showing one example of the printing setting input dialog.
Figure 8:
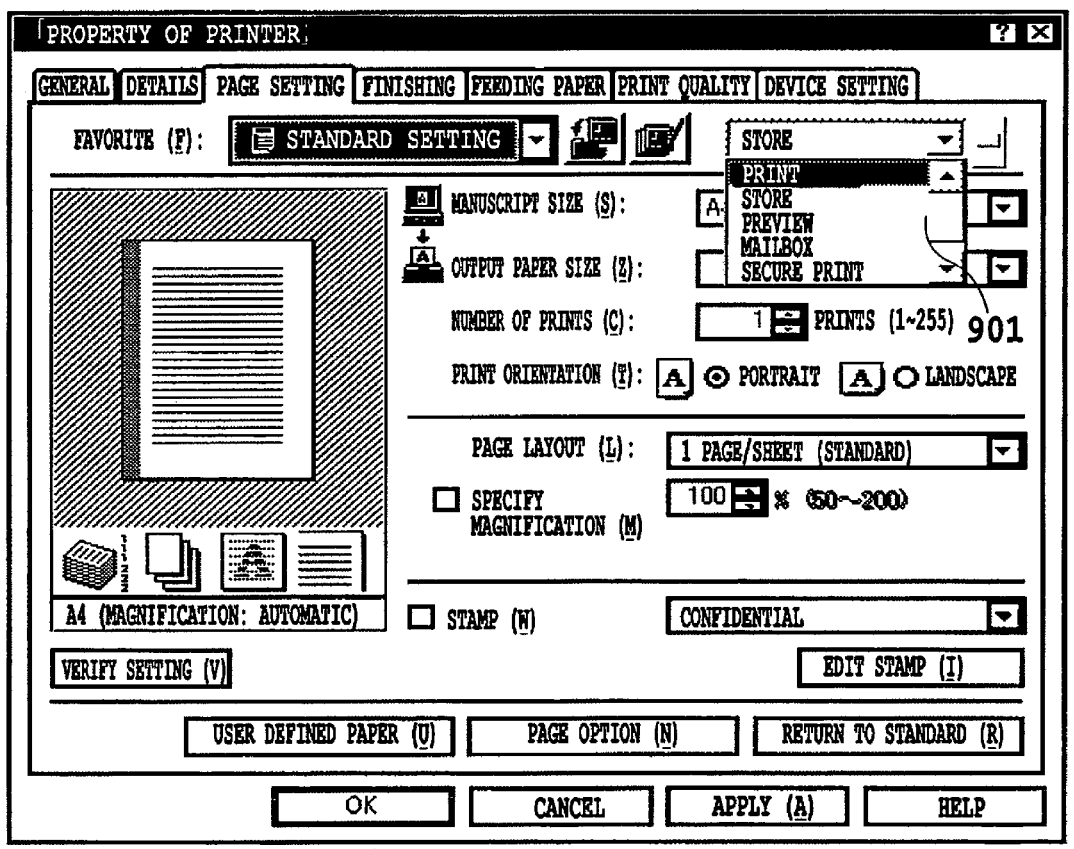
FIG. 8 is a view showing one example of a setup screen for output destinations of a print job.

In this figure, first, the spooler 302 receives a print request from the application through the graphic engine 202 in Step 501. In the application, a dialog through which printing settings as shown in FIG. 7 are entered is displayed, and the printer driver passes the printing settings entered through this dialog to the spooler 302. The setting input dialog shown in FIG. 7 includes a setup entry, represented by numeral 801, to determine the number of logical pages to be laid out on one physical page, and the like.

In Step 502, the spooler 302 determines whether the received print request is a job start request. Here, if the request is determined to be the job start request in Step 502, the operation flow (the flow) proceeds to Step 503, where the spooler 302 generates a spool file 303 in which intermediate data is temporarily stored.

Subsequently, in Step 504, the spooler 302 notifies the spool file manager 304 of the progress of the print processing. In subsequent Step 502, the spooler 302 initializes a page number counter thereof to unity. Here, the spool file manager 304 reads and stores information of the job for which printing is started, processing setting, or the like from a spool file 303.

On the other hand, in Step 502, if the request is determined not to be the job start request, the flow proceeds to Step 506. In this Step 506, the spooler 302 determines whether the received request is a job end request. If the request is determined not to be the job end request, the flow proceeds to Step 507, where the spooler 302 determines whether the request is a page feed request. If the request is determined to be the page feed request in Step 507, the flow proceeds to Step 508, where the spooler 302 notifies the spool file manager 304 of the progress of the print processing. Then, the spooler 302 increments the page counter, closes the page description file storing the intermediate codes, and generates a next page description file. If the spooler 302 determines that the received request is not a page feed request in Step 507, the flow proceeds to Step 509, where the spooler 302 prepares writing of the intermediate codes in the page description file.

Next, in Step 510, in order to store the print request in the spool file 303, the spooler 302 transforms the DDI function of the print request into the intermediate code. In Step 511, the spooler 302 writes the print request (intermediate code) transformed into a storable form in Step 510 in the page description file of the spool file 303. Then, the flow returns to Step 501 to receive a print request from the application again. This process consisting of a series of Step 501 through Step 511 is continued until a job end request is received from the application. Moreover, the spooler 302 acquires simultaneously information of processing setting stored in a DEVMODE structure from a printer driver 203, and stores it in a spool file 303 as the job setting file.

On the other hand, if the spooler 302 determines a print request from the application to be a job end request in Step 506, the flow proceeds to Step 512 because the print request from the application has been all completed. There the spooler 302 notifies the spool file manager 304 of the progress of the print processing and finishes the processing.

Generation of Spool File

Figure 5B:
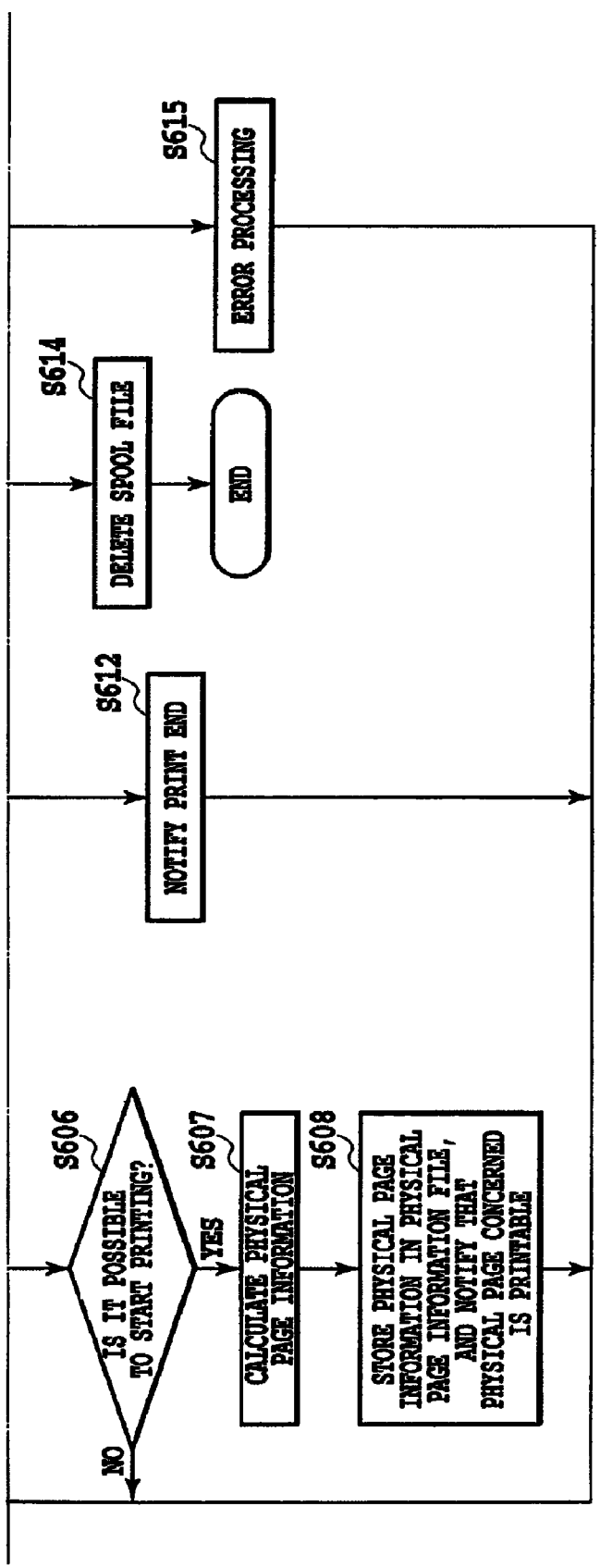
FIG. 5 is a block diagram showing a relation between FIG. 5A and FIG. 5B, and FIGS. 5A and 5B are flowcharts showing details of control between a spool file 303 generating process and a print-data generating process, which will be described below, in a spool file manager 304.

FIG. 5 is a flowchart showing details of control between the spool file 303 generating process and the print-data generating process in the spool file manager 304.

In Step 601, the spool file manager 304 receives a notification of the progress of the print processing from the spooler 302 or the despooler 305. Then, in Step 602, the spool file manager 304 determines whether the notification of progress is a print start notification from the spooler 302 notified in the above-mentioned Step 504. If the notification is the print start notification, the flow proceeds to Step 603, where the spool file manager 304 reads processing setting of printing from the spool file 303 and starts management of the job.

On the other hand, in Step 602, if the notification is not the print start notification from the spooler 302, the flow proceeds to Step 604. In Step 604, the spool file manager 304 determines whether the notification of progress is a print end notification of one logical page from the spooler 302 notified in the above-mentioned step 508. Here, if the notification is the print end notification of one logical page, the flow proceeds to Step 605, where the logical page information for this logical page is stored. Then, in subsequent Step 606, the spool file manager 304 determines whether printing of one physical page can be started for n-logical pages whose spooling has ended at this time. Here, if being printable, the flow proceeds to Step 607, where a physical page number is determined based on a logical number assigned to one physical page to be printed.

Calculation of physical pages is done as follows: for example, in the case where processing setting is such that four logical pages are arranged in one physical page, the first page becomes ready to be printed at the time when the fourth logical page has been spooled, the first page being outputted after the printing. Then, the second physical page becomes ready to be printed at the time when the eighth logical page has been spooled. Incidentally, even if the total number of logical pages is not a multiple of the number of logical pages arranged in one physical page, the logical pages arranged in one physical page can be determined with a spool end notification in Step 512.

Figure 9:
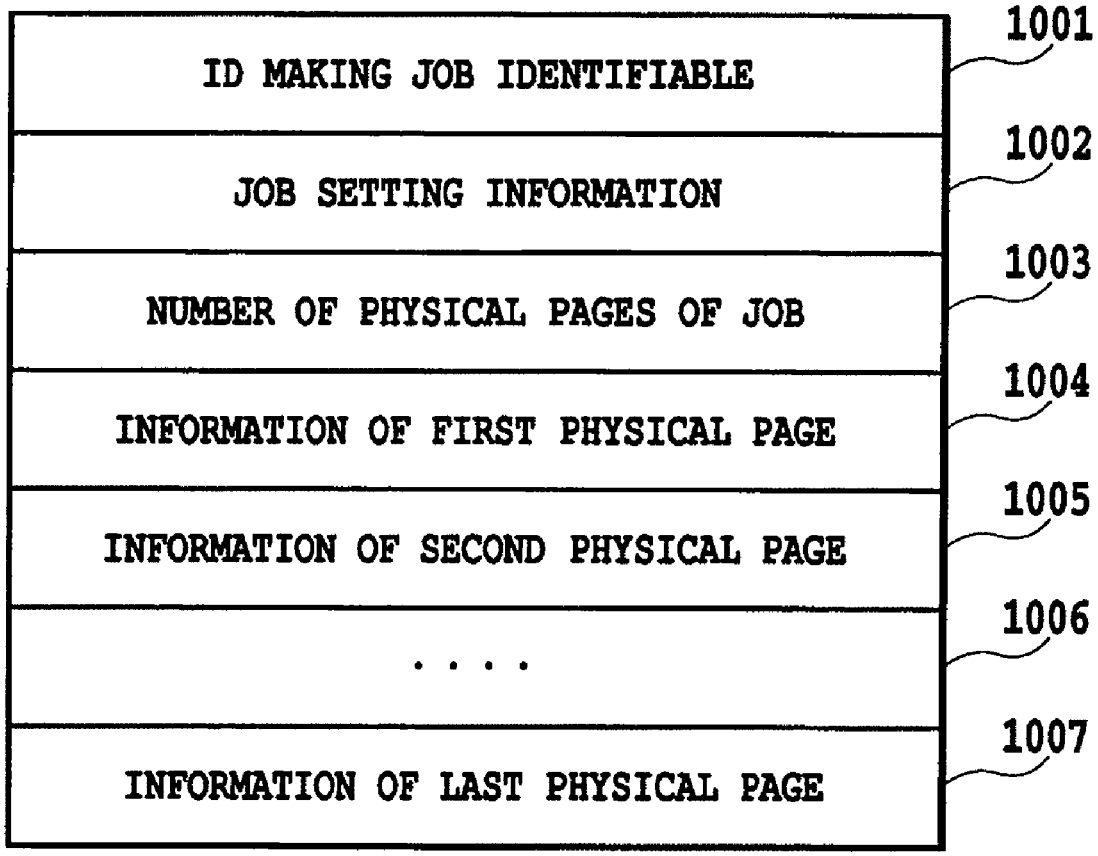
FIG. 9 is a view showing one example of a data format that is passed to the despooler 305 from the spool file manager 304 when issuing a print request of physical pages thereto.

Further, in Step 608, information of logical page numbers constituting physical pages that become ready to be printed, their physical pages, or the like are stored in a job-output setting file (a file containing physical page information). FIG. 9 shows a storing format. It is notified to the despooler 305 that physical page information has been added for one physical page. Subsequently the flow returns to Step 601 to wait for a next notification. In this embodiment, the print processing is possible when one page of print data, i.e., logical pages constituting one physical page, is spooled, even if the whole print job has not been finished.

On the other hand, when a notification of progress is not a print end notification of one logical page from the spooler 302 in Step 604, the flow proceeds to Step 609, where the spool file manager 304 determines whether the notification is a job end notification from the spooler 302 notified in the above-mentioned Step 512. Here, if the notification is the job end notification, the flow proceeds to the above-mentioned Step 606. On the other hand, if the notification is not the job end notification, the flow proceeds to Step 610, where the spool file manager 304 determines whether the received notification is a print end notification for one physical page from the despooler 305. Here, if the notification is the print end notification for one physical page, the flow proceeds to Step 612, where the spool file manager 304 determines whether the whole of the processing setting has been finished. If the process is finished, the flow proceeds to step 612, where the spool file manager 304 notifies the spooler 305 of termination of the processing. On the other hand, if it is determined that the process of processing setting has not been finished, the flow proceeds to the above-mentioned Step 606. The despooler 305 in this embodiment takes one physical page as a unit by which the despooler 305 performs the print processing. Moreover, in Step 608, adopted is a style that information necessary to perform the print processing of one physical page is stored in a file sequentially, so that the file is reusable. If reuse is unnecessary, the information processing apparatus may be of an implementation type that a fast medium, such as shared memory, is used and the medium is overwritten in units of physical page successively to enhance the speed and save resources. Moreover, in the case where the progress of despooling is faster than the progress of spooling or in the case where despooling is started after the termination of the spooling of all pages, by notifying the content that a plurality of physical pages or all physical pages become printable in response to the progress of despooling side, without notifying that page printing is possible for each physical page, in Step 608, then number of notifications can be saved.

If the notification is determined not to be a print end notification of one physical page from the despooler 305 in Step 610, the flow proceeds to Step 613, where the spool file manager 304 determines whether the notification is a print end notification from the despooler 305. If the notification is determined to be the print end notification from the despooler 305, the flow proceeds to Step 614, where the spool file manager 304 deletes a corresponding page description file 303 and finishes the processing. On the other hand, if the notification is not the print end notification from the despooler 305, the flow proceeds to Step 615, where the spool file manager 304 performs other normal processing and waits for a next notification.

Output of Spool File

Figure 6:
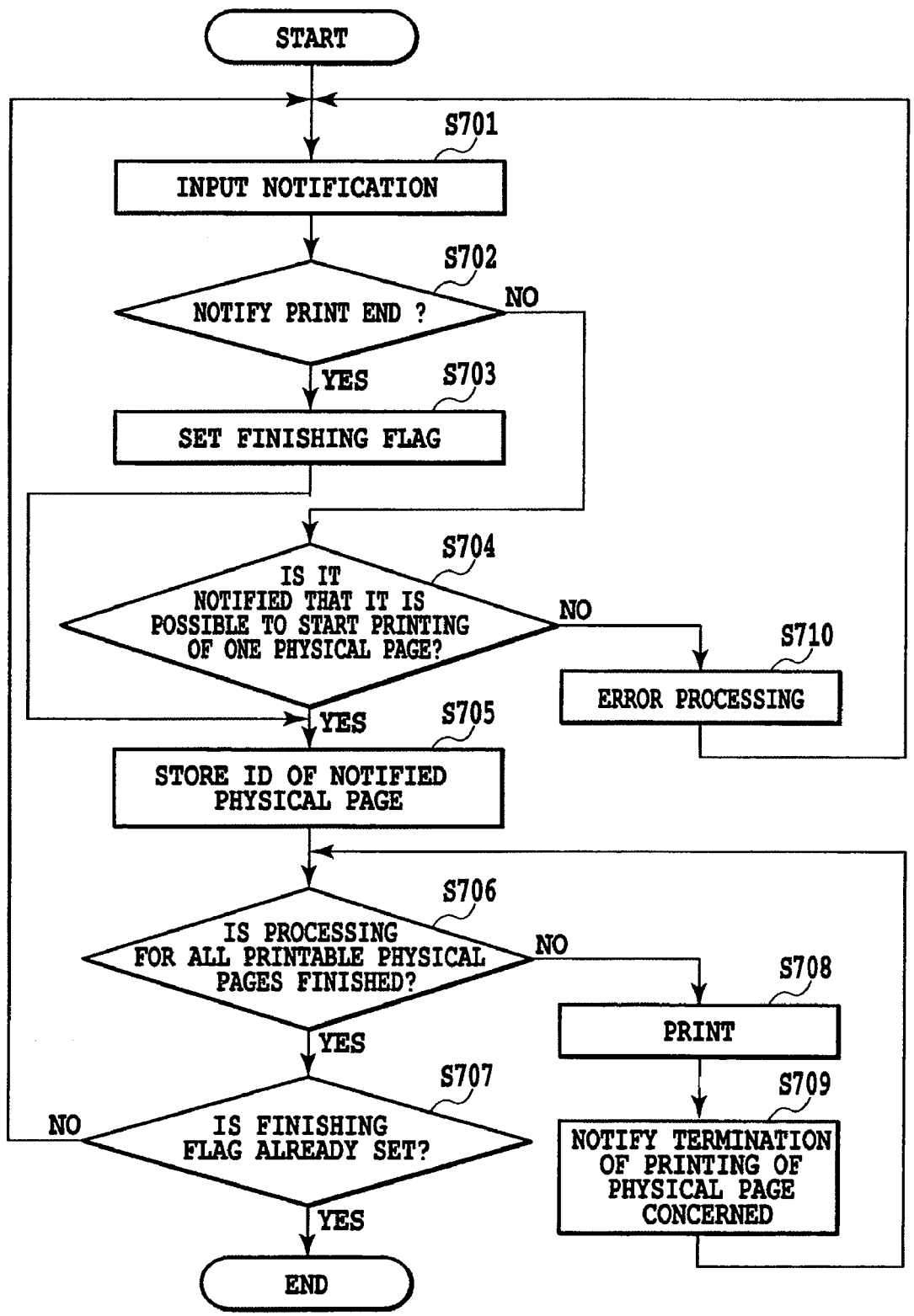
FIG. 6 is a flowchart showing details of the print-data generating process in a despooler 305.

FIG. 6 is a flowchart showing details of the print-data generating process in the despooler 305.

In response to a print request from the spool file manager 304, the despooler 305 reads necessary information (page description file and spool description file) from the spool file 303 and generates print data. A method of transferring the generated print data to the printer is as already discussed in FIG. 3. Moreover, print data is in PDL as already discussed.

In generating print data, first a notification from the above-mentioned spool file manager 304 is inputted to the despooler 305 in Step 701. In subsequent Step 702, the despooler 305 determines whether the inputted notification is a job end notification. If the notification is the job end notification, the flow proceeds to Step 703, where the despooler 305 set an ending flag, and the flow proceeds to Step 705. On the other hand, if the notification is not the job end notification in Step 702, the flow proceeds to Step 704, where the despooler 305 determines whether the print start request of one physical page in the above-mentioned Step 608 was notified. If the notified request is not determined to be the print start request in Step 704, the flow proceeds to Step 710, where the despooler 305 performs other error processing, and the flow returns to Step 701 to wait for a next notification.

On the other hand, if the request is determined to be the print start request of one physical page in Step 704, the flow proceeds to Step 705, where the despooler 305 saves the ID of printable physical pages notified in Step 704. In subsequent Step 706, the despooler 305 determines whether the print processing has been finished for all physical pages whose IDs are saved in Step 705. Here, if all physical pages have been processed, the flow proceeds to Step 707, where the despooler 305 determines whether an ending flag is set in the above-mentioned Step 703. If the ending flag is set, the job is assumed to have been printed, the despooler 305 notifies the spool file manager 304 of termination of the processing thereof and finishes the processing. In Step 707, if the ending flag is not set, the flow returns to Step 701 to wait for a next notification.

On the other hand, if it is determined that printable physical pages are remaining in Step 706, the flow proceeds to Step 708, where the despooler 305 reads IDs of unprocessed physical pages from saved physical page IDs successively, reads information necessary to generate print data of physical pages corresponding to the read physical page IDs, and perform the print processing. To perform the print processing, the despooler 305 transforms a print instruction stored in the spool file 303 into a format (GDI function) conceivable to the graphic engine 202 and transfers it. For the processing setting to lay out a plurality of logical pages in one physical page (hereinafter referred to as N-page printing), the despooler 305 transforms it considering size reduction and arrangement in this step.

When having finished necessary print processing, the despooler 305 notifies the spool file manager 304 of termination of print data generation of one physical page in subsequent Step 709. Then, the flow returns to Step 706 again, and Steps 708, 709, and 706 are repeated until the print processing is performed for all IDs of printable physical pages saved in Step 705.

The above is a flow of the print processing using the dispatcher 301, the spooler 302, the spool file manager 304, and the despooler 305. By processing as described above, the application 201 is released from the print processing at the time when the spooler 302 generates the intermediate code and stores it in the spool file 303; therefore, the print processing can be finished in a shorter time than the print data is directly outputted to the printer driver 203. Moreover, since the intermediate files (the page description file and the spool description file) based on printing settings of the printer driver are kept temporarily in the spool file 303, the user is enabled to recognize a print preview of what will be printed actually. Moreover, since the intermediate file is being kept, a combination and rearrangement of print jobs generated by two or more applications become possible, and alteration of the printing setting is feasible without launching the application again to perform printing.

Note that the job-output setting file is generated at the time of requesting the graphic engine 202 to perform printing in the print processing using the spooler 302, and that the job-output setting file is also generated when preview, job combination, or the like is performed. The job-output setting file is equal to the spool description file in the case of a single job; the job-output setting file is generated based on two or more pieces of the job setting information in the case of a combined job. Here, the job-output setting file will be described.

Composition of Job-output Setting File

FIG. 9 shows an example of the job-output setting file keeping information constituting physical pages that has been generated to be printable by the spool file manager 304 in Step 608. The field 1001 is for an ID used for identifying a job. This ID can also be kept in the form of the name of a file name or the name of shared memory that keeps this information. The field 1002 is for the job setting information. The job setting information includes one piece of information that can be set up for one job as follows: a structure necessary to start printing of a job for the graphic engine 202; specifications of N-page printing; specifications of additional drawing, such as a page frame; finishing specifications, such as the number of copies and stapling; and the like. In the job setting information 1002, enough information is stored according to functions for the job. The field 1003 is for the number of physical pages of a job, which indicates as much pieces of physical page information as this figure are stored in subsequent fields after this. Since this embodiment adopts a system of notifying the number of printable physical pages, the equipment can work without this field. After this field, a field 1004 through the last field store physical page information to the number stored in the field 1003. Physical page information will be described in FIG. 12.

Figure 10:
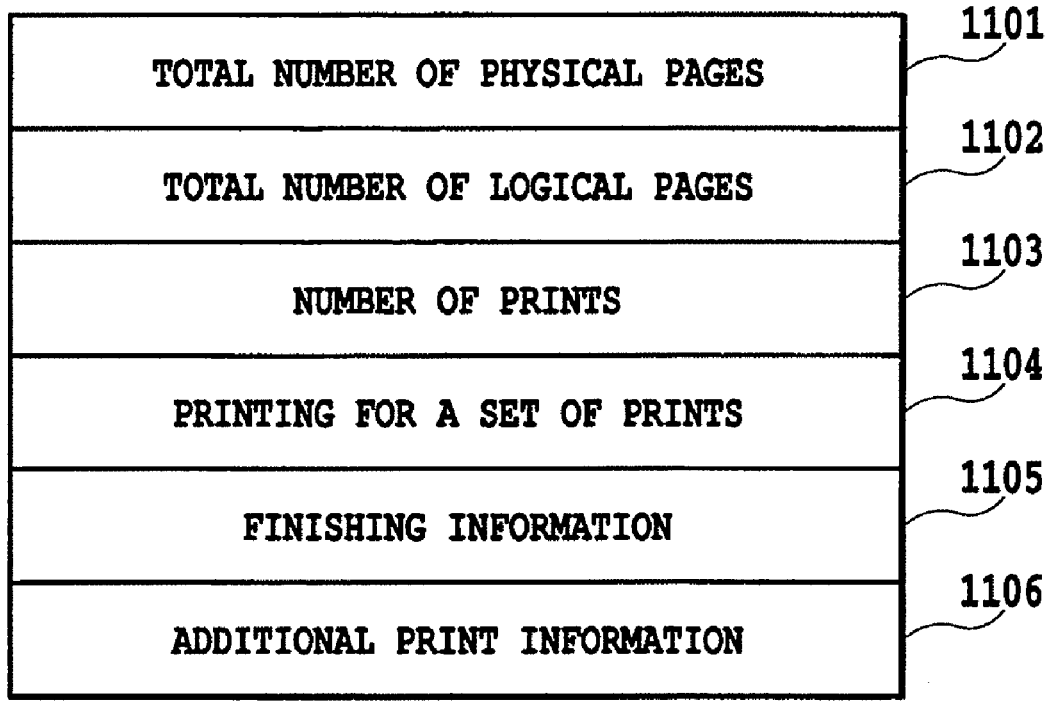
FIG. 10 is a view showing one example of job setting information shown in the field 1002 of FIG. 9.

FIG. 10 is a view showing one example of the job setting information shown in the field 1002 of FIG. 9. The field 1101 is for the total number of physical pages. The field 1102 is for the total number of logical pages. The fields 1101 and 1102 are used in the case of printing the number of pages etc. as additional information in addition to the print data, and in other cases. When printing is being continued, the both fields are set to temporal values, or the spool file manager 304 postpones generation of information of printable physical pages until the printing is finished. A field 1103 is for number-of-copies information that specifies how many copies of this print job should be printed. A field 1104 is for specifying whether printing should be done by making collated sets of copies in the case where the field 1103 specifies printing of two or more sets of copies. A field 1104 is for specifying finishing information, such as stapling, punching, and Z-character folding, which is specified in the case where the printer has a finisher in it or outside the printer. A field 1106 is for storing addition print information that is added to a job as follows: the tint block printing according to the present invention; decoration such as a page frame; additional information such as date; user name; the number of pages; watermark printing; etc. As the number of functions increases, the number of fields included in this job setting information increases. For example, in the case where the printer is capable of double face printing, a field for storing specifications of double face printing is added.

Figure 11:
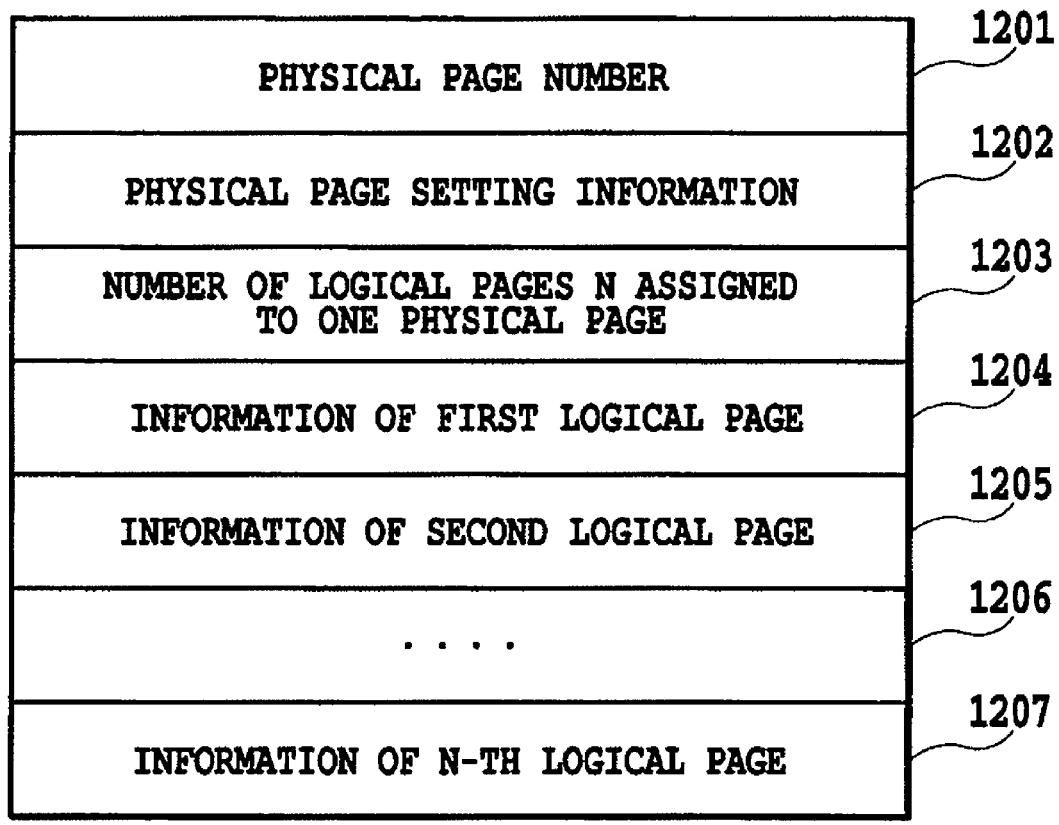
FIG. 11 is a view showing one example of a data format that is passed to the despooler 305 from the spool file manager 304 when issuing the print request of physical pages thereto.

FIG. 11 is a view showing one example of the physical page information shown in the field 1004 of FIG. 9. The first field 1201 is for physical page number, whose value is used in managing the order of printing and in printing the physical page number additionally. The field 1202 is for physical page setting information, storing settings of layout and color/monochrome if layout and color/monochrome can be specified for each physical page. The field 1203 is for the number of logical pages allocated to this physical page; when four pages are allocated to one physical page, an ID indicating "4" or "four page printing" is stored. The field 1204 and subsequent fields store information of the logical page by the number specified by the field 1203. The may be a case where the actual number of page data becomes fewer than the number of pages specified by the field 1203 depending on the number of pages printed by the application 201. In that case, this discrepancy is coped with by storing special data indicating an empty page in the logical page information.

Figure 12:
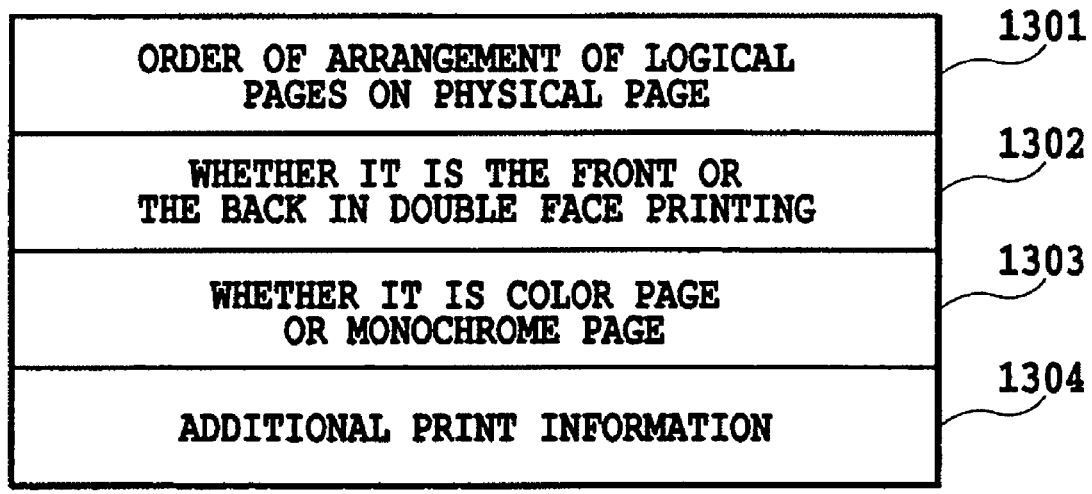
FIG. 12 is a view of an example of physical page setting information in the field 1202 in FIG. 11.

FIG. 12 is a view showing an example of the physical page setting information 1202. The field 1301 is for the order of arrangement of logical pages on physical page, storing specifications on how the logical pages should be arranged on the physical page in N-page printing (the upper left to the side, the upper left to the down, etc.). Some system may arrange pieces of logical page information in the field 1204 and thereafter, not in the order of page number, but in the order of arrangement in place of the setting of the field 1301. The field 1302 is for information of the front/back in double face printing, which is used, for example, to set a binding margin in a proper side for the front and the back. The field 1303 is for specifying color pages or monochrome pages, storing a value used in the case where a printer has a monochrome mode and a color mode, and the user wishes to print color pages in a color mode and monochrome pages in a monochrome mode in a document mixed with color pages and monochrome pages, and in other cases. The field 1304 is for additional print information, used in the case of printing additional information, such as the page number and date, on the physical page. As for physical page setting information, a field may be added according to functions of the system.

In this embodiment, since the tint block image printing explained with reference to FIG. 15 and thereafter is information added to the physical page, it is also stored in the field 1304 as setting information for each physical page based on information about the tint block printing kept in the field 1106 shown in FIG. 10. One example of data format used for storing the setting information about the tint block printing in the additional print information 1106 and the additional print information 1304 for a job will be described later with reference to FIG. 14.

Figure 13:
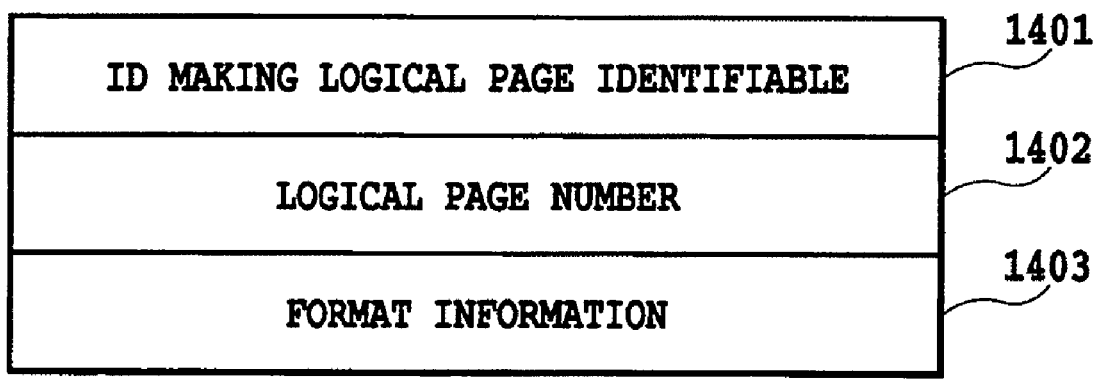
FIG. 13 is a view showing one example of a data format that is passed to the despooler 305 from the spool file manager 304 when issuing the print request of physical pages thereto.

FIG. 13 is a view showing one example of logical page information shown in the field 1204. The field 1401 is for the ID of a logical page, and using this ID an intermediate code of the page description file corresponding to the logical page is referred from the spool file 303. This ID is just required to allow access to the intermediate code of the logical page using this ID, and may be a file, a memory pointer, or the intermediate code itself constituting the logical page. The field 1402 is for the logical page number, and is used in the case of printing the logical page as additional information or used as supplementary information to the logical page ID. Various setting entries that can be stored in units of logical page are stored in the field 1403 of format information. For example, information of various setting specified in units of logical page, such as additional printing information, such as a page frame, and enlargement/reduction ratio. Moreover, if necessary, it is also possible to store attribute information for logical page, such as color/monochrome information for each logical page. On the contrary, in such a system as requires neither switching of the settings in units of logical page nor attribute information for each logical page, the field 1403 is unnecessary.

The job-output setting file is composed as described above. In addition, the spool description file is almost the same as the job-output setting file; for job information, consisting of printing appearance (single-sided/double-sided, printing and book binding), printing layout (N-up, poster printing), additional information (tint block printing information, watermarking, date, username, etc.), the number of copies, and paper size; and for each physical page, consisting of arrangement order of logical pages, whether it is the front or the back in double face printing, a color mode, etc.

Further FIG. 3 shows an example in which the setting change editor 307 with a function of changing settings of a job is placed in addition to the expansion system that has heretofore been described. The setting change editor 307 is an editor that can change interactively the contents of the spool description file or the job-output setting file both mentioned above. Since the setting change editor 307 is not related to the present invention directly, its explanation is omitted.

Explanation of Print-data Generating Process of Tint Block Image

One embodiment of the present invention relates to a configuration in which the user selects either watermark printing of a tint block image or superposition printing of the tint block image arbitrarily. To be concrete, the user selects either the watermark printing or the superposition printing through an interface with a radio button 2210 used for selecting either the watermark printing or the superposition printing both shown in FIG. 16A, whereby the final order of superposition of the tint block image data and the printout image data (manuscript data) is determined. Then, according to the order, the watermark printing of the tint block image explained in FIG. 17 or the superposition printing of the tint block image explained in FIG. 18 is performed. Concrete contents of the watermark printing and the superposition printing will be described later.

FIG. 15 through FIGS. 16A and 16B are views showing one example of the user interface by which a setup about the tint block image printing is performed.

Figure 15:
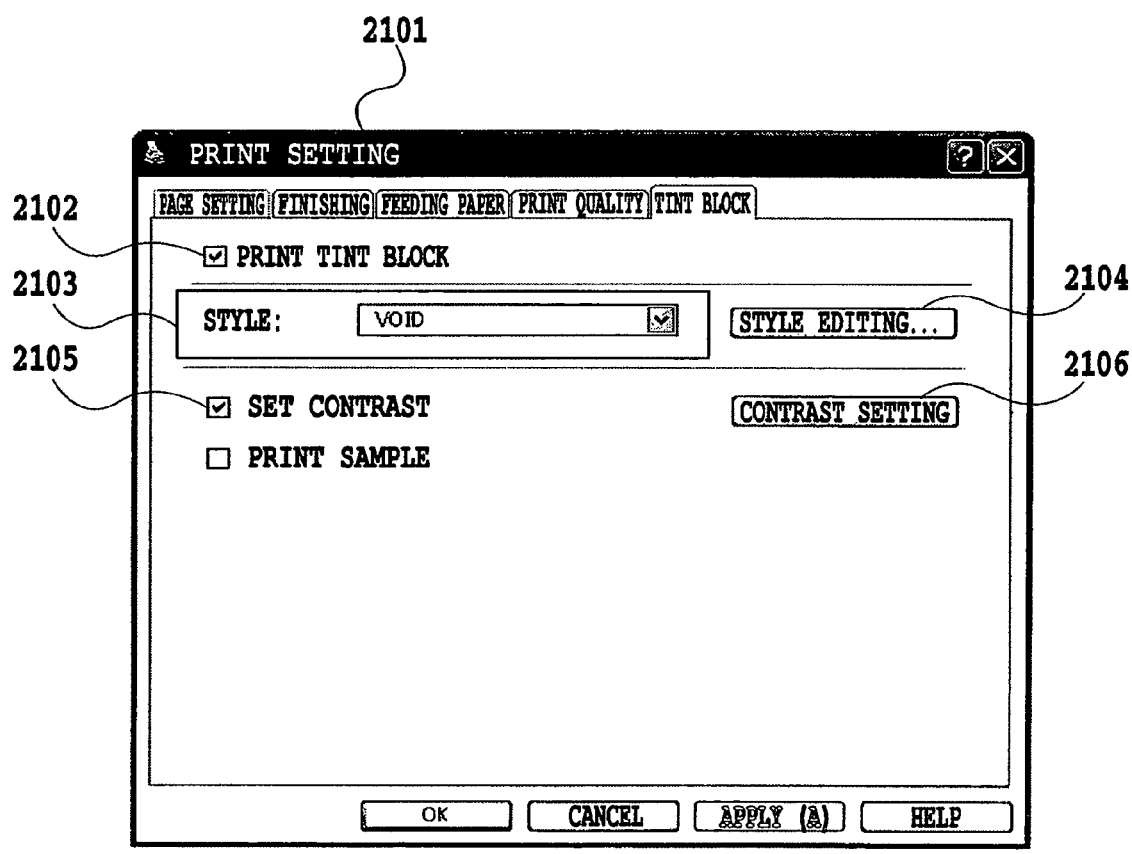
FIG. 15 is a view showing one example of a setup screen of tint block printing function.

FIG. 15 is one example of an initial screen of the user interface related to the tint block printing, the user interface being placed in the printer driver 203. In this example, the user interface allows the user to make settings about the tint block printing in a property sheet 2101 in the dialog.

Figure 14:
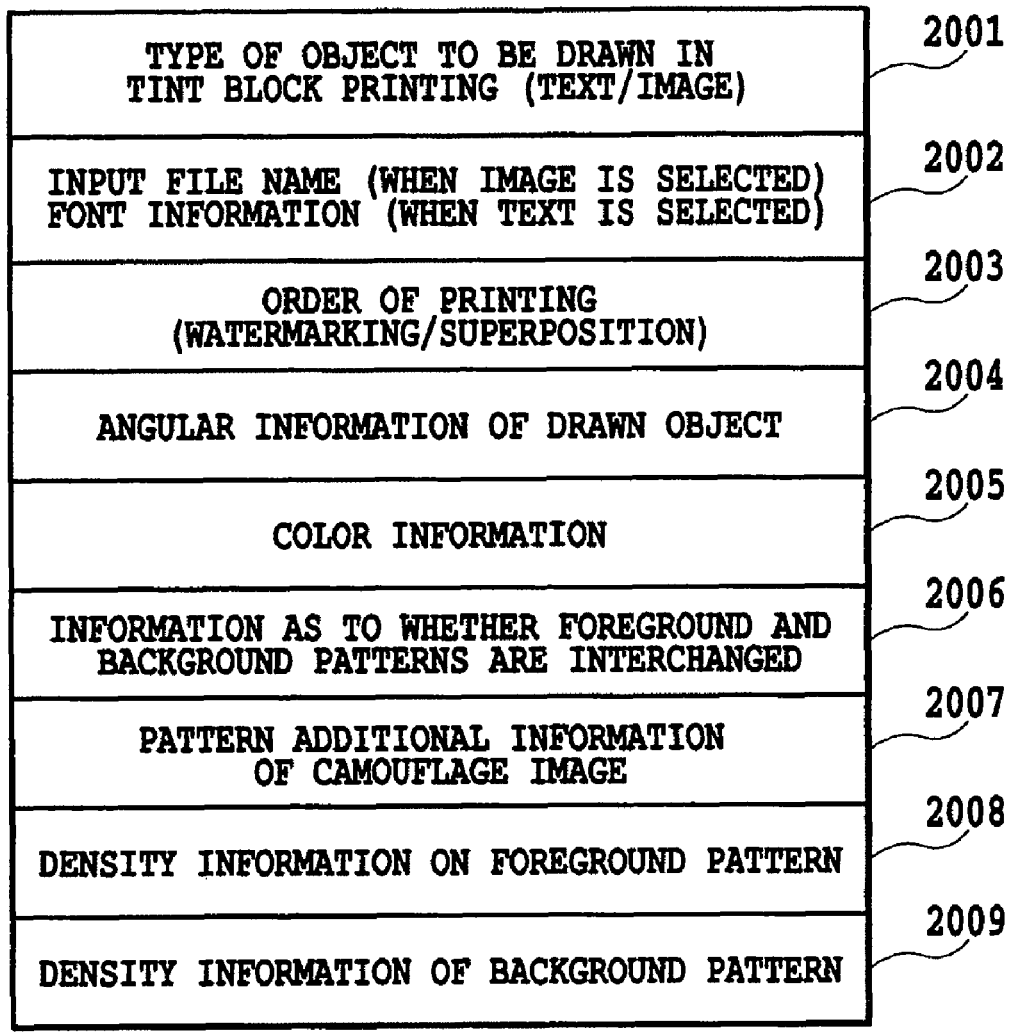
FIG. 14 is a view showing one example of the data format of additional print information 1304 in FIG. 12.
Figure 16A:
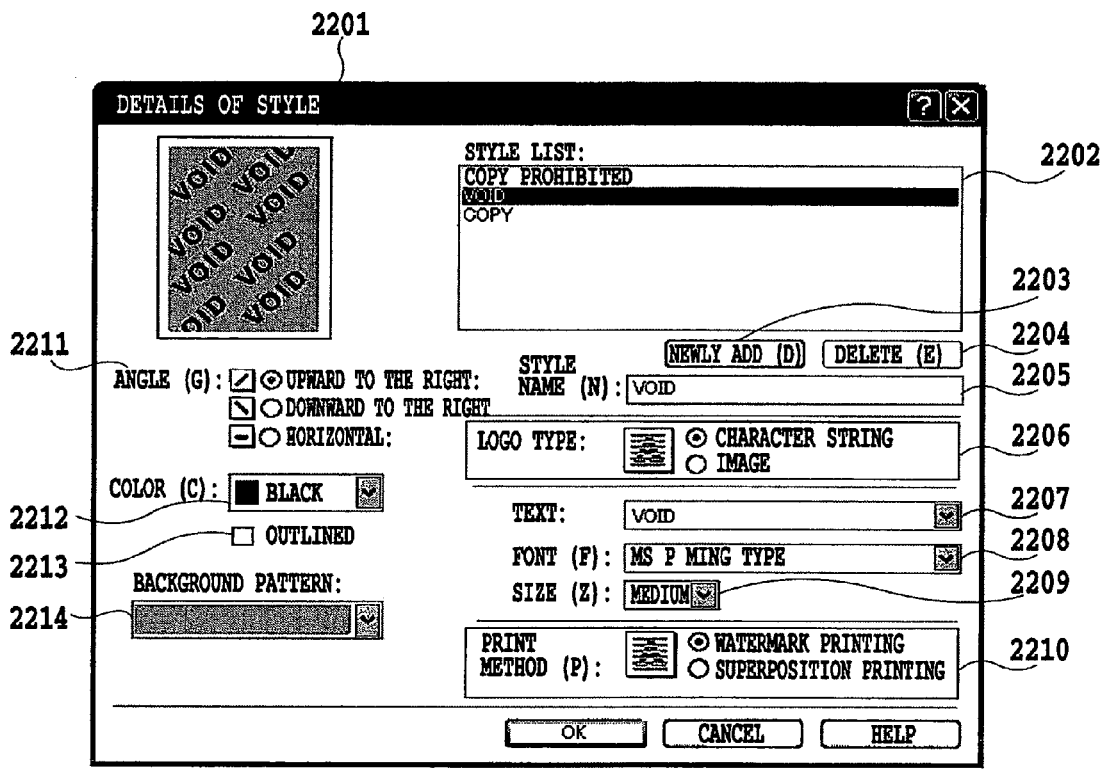
FIGS. 16A and 16B are views showing one example of the dialog used for editing detailed setting of the tint block printing function.

Reference numeral 2102 denotes a check box used for specifying whether the tint block printing (printing including the tint block image, and the sane thereafter) is performed for the print job. This specification is stored in the additional printing information 1106 in FIG. 10 as a setting as to whether the tint block printing is performed. Numeral 2103 denotes a field for storing style information for enabling a single identifier (style) to specify two or more pieces of setting information of the tint block printing. The printer driver 203 is made capable of selecting a plurality of styles, and a relationship between each style and the tint block printing information shown in FIG. 14 is registered in a registry. Moreover, by the user pressing the button 2104, a dialog for style editing 2201 shown in FIG. 16A is displayed. Numeral 2105 denotes a check box used in adjusting the contrast between the foreground and the background in the tint block printing. When the user presses the button 2106, a contrast adjustment screen (not shown) will be displayed.

FIG. 16A is a view showing one example of a dialog used for editing individual detailed settings of the tint block printing.

In this figure, reference numeral 2201 denotes the whole dialog for editing tint block image information. In this display area, a result of the tint block image generated by several pieces of tint block image information that will be described later is displayed for preview. Numeral 2202 denotes an area for displaying a list of styles that can be selected in the area 2103 of FIG. 15. The user is allowed to add a new style and delete any style using the buttons 2203 and 2204. Reference numeral 2205 denotes an area where a style name currently specified is displayed.

Reference numeral 2206 denotes a radio button with which the kind of a drawing object used for tint block printing is selected. When the user selects a "character string" by operating this radio button 2206, the text object will be used; when the user selects an "image," image data typified by BMP etc. will be used. Since a "character string" is selected in FIGS. 16A and 16B, setting information specified by numerals 2207 through 2209 is displayed in the dialog 2201, and the user is allowed to edit it. On the other hand, when "Image" is selected in the area 2206, information 2207 through 2209 is not displayed, but instead an image file name in the field 2215 and a button 2216 for displaying a file selection dialog (not shown) are displayed, as shown in FIG. 16A.

Reference numeral 2207 denotes an area for displaying and editing a character string used as a tint block image. Numeral 2208 denotes an area for displaying and editing font information of the character string. Although in this embodiment a selection screen shows only font names, choices may be expands to information of a type face (bold, italic, etc.) and information of an initial decorated with figures so that the user can select it. Numeral 2209 denotes an area for displaying and specifying a font size of the character string used as the tint block pattern. Although this embodiment employs a style in which three stages of "Large," "Medium," and "Small" can be specified, a font-size specifying method commonly used, such as direct input of the point number, may be adopted. Numeral 2210 denotes a radio button with which the order of printing of the tint block pattern and the manuscript data is defined. When "watermark printing" is specified, the tint block image is drawn on bit map memory of the printer and subsequently the manuscript data is drawn so as to be overwritten on the tint block image. On the other hand, when "superposition printing" is specified, first the manuscript data is drawn on the memory and subsequently the tint block image is drawn thereon so as to be overwritten on the manuscript data. Detailed processing of the drawing will be described later.

Reference numeral 2211 denotes a radio button with which an arrangement angle of the tint block pattern is specified. In this embodiment, three choices of "upward to the right", "downward to the right", and "horizontal" are selectable. The angle specifying method may be expanded in such a way as to provide a numerical value entry area whereby an arbitrary angle can be specified or a slider bar that allows the user to specify an angle intuitively. Numeral 2212 denotes an area for displaying and specifying color used for the tint block pattern (foreground and background patterns). Numeral 2213 denotes a check box used for interchanging the foreground pattern and the background pattern. The tint block is printed as follows: if the check box is not checked off, the foreground pattern will show up in the duplicate at the time of copying; and if it is checked off, the background pattern will show up and the foreground pattern will be represented as outlined characters at the time of copying.

Reference numeral 2214 denotes an area used for specifying a camouflage image that makes the tint block pattern embedded in the manuscript hard to recognize, which can be selected from a plurality of patterns. Moreover, there is also provided a choice of using no camouflage image.

Data Format of Tint Block Printing Setting Information

Next, formats of data stored in additional print information 1106, 1304 related to the tint block printing setting information described in FIGS. 16A and 16B will be described using FIG. 14.

In this figure, the field 2001 stores a value indicating the type of drawing object (text or image) generated in the tint block printing that is specified in the area 2206 of FIG. 16A. The field 2002 stores setting information for a drawing object specified by information in the field 2001 that is specified by areas 2207-2209 in FIG. 16A or by FIG. 16B. When text is selected, it stores a character string, a font name, and size information; when image is selected, it stores a location of the image file to be inputted. The field 2003 stores information that specifies whether the tint block pattern is drawn prior to or after the manuscript data (the order of drawing) and that is specified in the area 2210 of FIG. 16A. The field 2004 stores information of an angle at which the drawing object is disposed and that is specified in the area 2211 of FIG. 16A. The field 2005 stores information of colors that are used in the tint block pattern (foreground and background patterns) and that are specified in the area 2212 of FIG. 16A. The field 2006 stores information as to whether the foreground pattern and the background pattern are interchanged and that is specified by the check box 2213 of FIG. 16A. The field 2007 stores pattern additional information of a camouflage image specified in the area 2214 of FIG. 16A. The field 2008 stores density information of the foreground pattern. The field 2009 stores density information of the background pattern.

Print-data Generating Process of Tint Block Image

Figure 17:
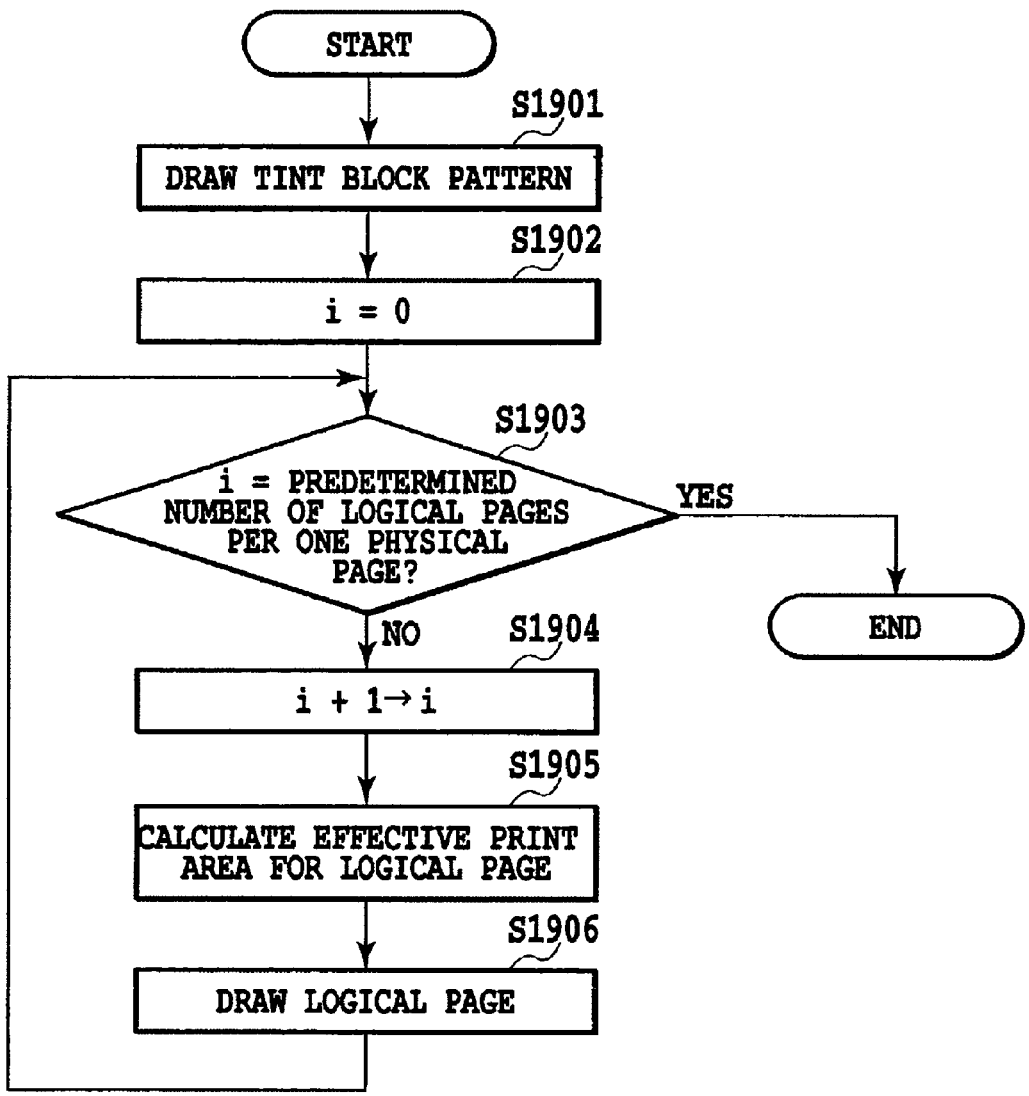
FIG. 17 is a flowchart showing one example of a drawing process of a tint block pattern.
Figure 18:
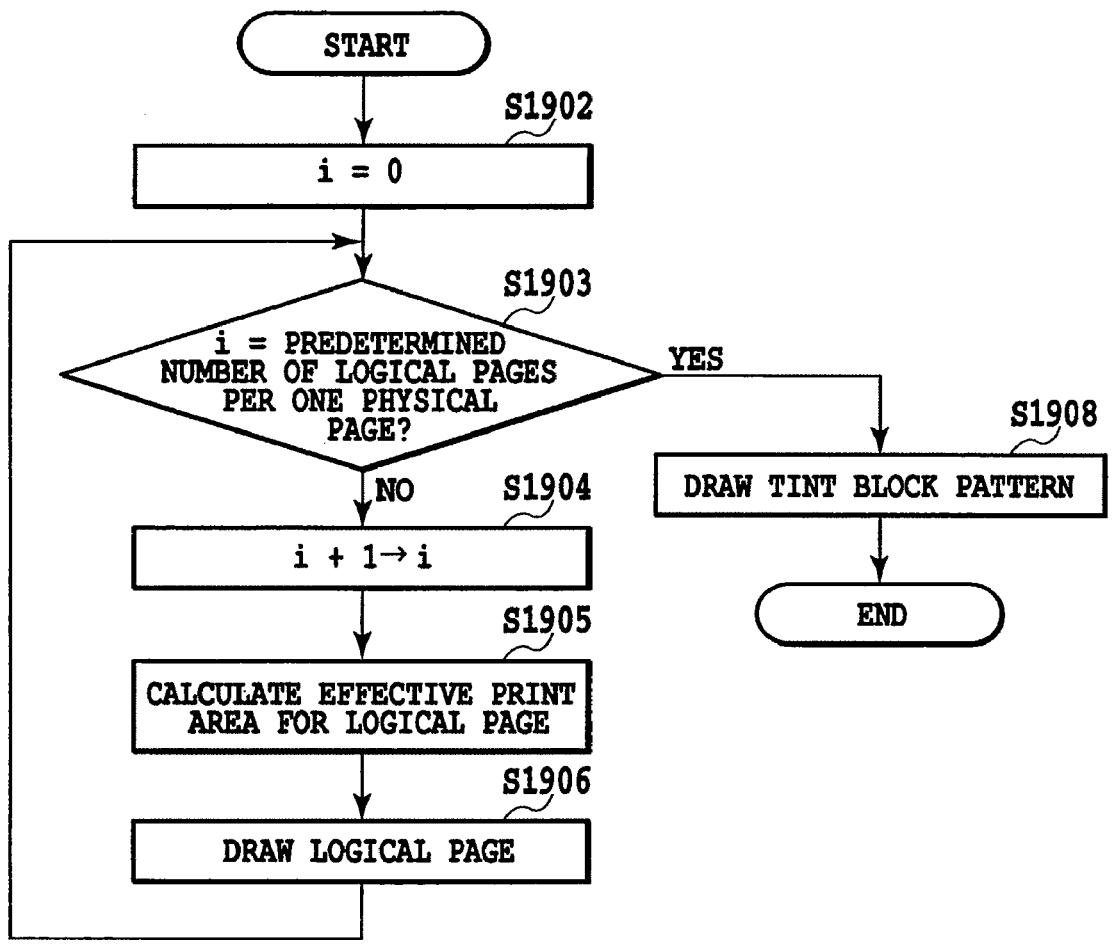
FIG. 18 is a flowchart showing another example of a drawing process of the tint block pattern.

FIG. 17 and FIG. 18 are flowcharts showing a flow of print-data generating process of the tint block image in the tint block printing. These figures correspond to "watermark printing" and "superposition printing" explained in FIG. 16A, respectively. These processes are performed in the course of the print processing in Step 708 of FIG. 6, i.e., in the print data generating process.

First, "watermark printing," i.e., a case where print data of the tint block image is generated in advance will be described using the flowchart of FIG. 17. As described above, "watermark printing" is a process of rasterizing manuscript data over the tint block image data in bit map memory of a printer. Therefore, the order of generation of print data is such that the print data of the tint block image is generated prior to generation of the print data corresponding to the manuscript data.

In Step 190, the tint block processing section 205 generates a tint block image according to information on the tint block shown in FIG. 14. The detailed processing will be described later with reference to FIG. 19. Then, a print-data generating process of the manuscript data is performed. The counter is initialized in Step 1902. In Step 1903, it is determined whether the counter indicates the number of logical pages per physical page previously set. If it becomes equal to the number of logical pages, this processing is finished; if it is not equal, the flow proceeds to Step 1904. The counter is incremented by unity in Step 1904. In Step 1905, an effective print area for logical pages for which the print-data generating process will be preformed after this based on the number of logical pages per physical page and the counter. In Step 1906, the current logical page number is read using the counter as an index based on information on the physical page informed in the format as FIG. 1, and pertinent logical pages are reduced in size so as to fit into the effective print area. However, if the N-page printing is not specified, naturally there is no necessity for reduction.

Next, a case of "superposition printing," that is, a case where print data of the manuscript data is generated in advance will be described using the flowchart of FIG. 18. As described above, "superposition printing" is a process of rasterizing the tint block image on the manuscript data in the bit map memory of the printer. Therefore, the order of generation of print data will be such that print data corresponding to the manuscript data is generated prior to generation of print data corresponding to the tint block image.

The counter is initialized in Step 1902. Next, in Step 1903, it is determined whether the counter becomes the number of logical pages per physical page previously set. If it becomes equal to that number of logical pages, the flow proceeds to Step 1908; if it is not equal, the flow proceeds to Step 1904. The counter is incremented by unity in Step 1904. In Step 1905, an effective print area for logical pages that will be generated after this is calculated based on the number of logical pages per physical page and the counter. In Step 1906, the current logical page number is read using the counter as an index based on information about the physical page notified in the form as of FIG. 11, and pertinent logical pages are reduced in size so as to fit in the effective print area. However, if the N-page printing is not specified, naturally there is no necessity for reduction. When the print data corresponding to the predetermined number of logical pages as one physical page has been generated, the flow proceeds to Step 1908. In Step 1908, the tint block processing section 205 generates the tint block image according to the information on the tint block shown in FIG. 14 based on the effective print area of the physical page acquired from the application. The detailed processing will be described later with reference to FIG. 19.

Figure 19:
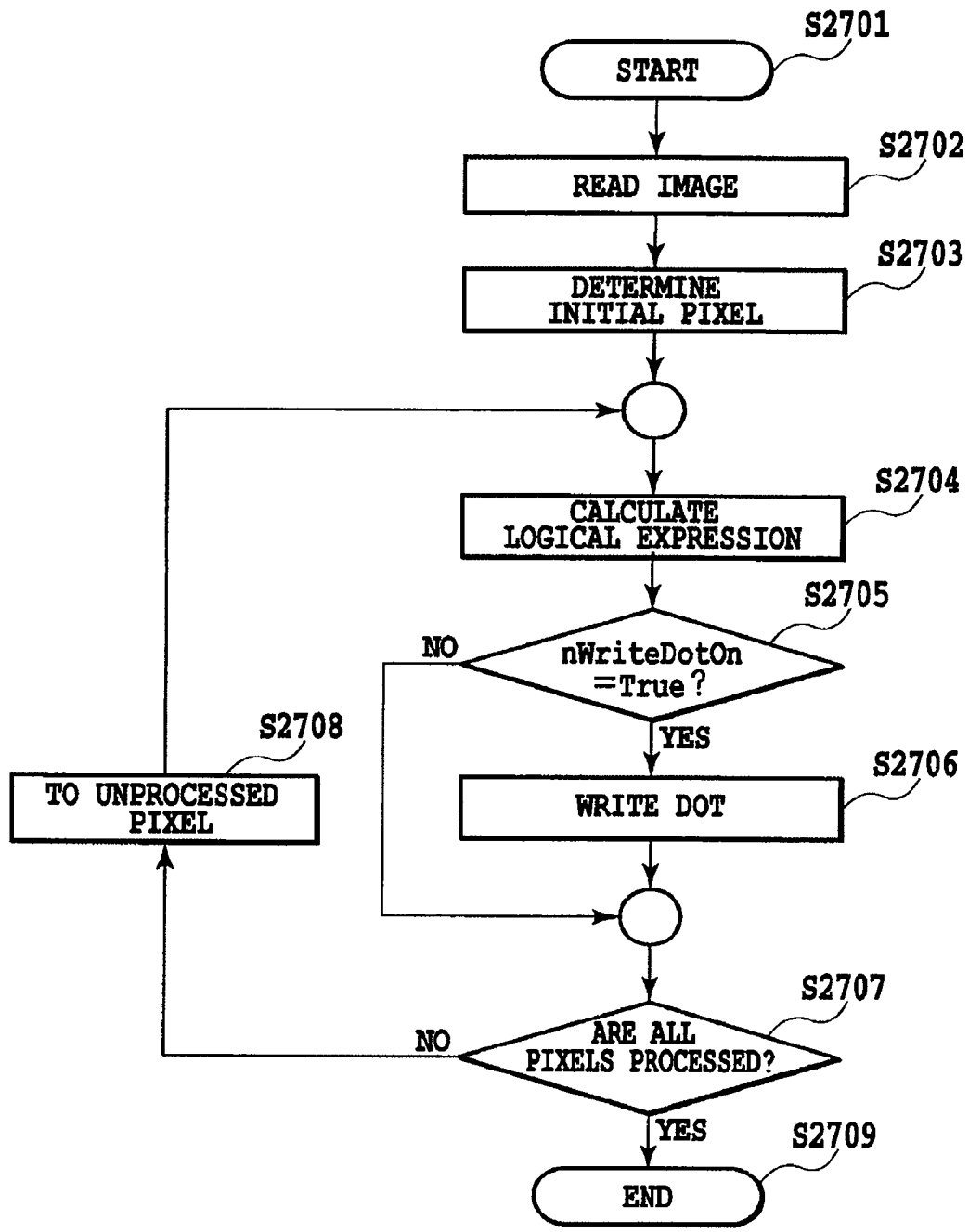
FIG. 19 is a flowchart showing steps of the drawing process of the tint block pattern.

FIG. 19 is a flowchart showing details of the tint block image generating process in Step 1901 shown in FIG. 17 and of the tint block image generating process in Step 1908 shown in FIG. 18, both according to the one embodiment of the present invention. Hereafter, the tint block image generating process will be described with reference to FIG. 19.

First, the tint block image generating process is started in Step 2701. To be concrete, a tint block image generation direction and the above-mentioned tint block printing setting information are inputted to the tint block processing section 205. Next, the tint block processing section 205 reads a background threshold pattern, a foreground threshold pattern, a basic image, and a camouflage image in Step 2702. Here, the basic image is image data serving as a base for generating the tint block image. This is an image generated by the despooler 305 based on various setting information shown in FIG. 14.

Further, the tint block processing section 205 determines an initial pixel in generating the tint block image in Step 2703. For example, when the tint block image is generated by performing image processing in order of raster scanning, from the upper left to the lower right, on the whole printable area of A4 paper, the upper left of the printable area is specified as an initial position. In this case, the printable area and the tint block image area are equal.

Next, in Step 2704, the tint block processing section 205 performs processing to arrange the background threshold pattern, the foreground threshold pattern, the basic image, and the camouflage image in tiles on the tint block image area, starting from the upper left of that area, by calculation based on the following expression (1). By this calculation, it is determined whether a pixel value corresponding to a dot at the time of printing is written in the said pixel position. At this time, the pixel value corresponds to color information entered. Here, the background threshold pattern and the foreground threshold pattern are image data consisting of "1" and "0" that correspond to writing/unwriting of a dot. These images are data binarized by respective dither matrices suitable for forming the foreground (latent) image and the background image, respectively.

$$\text{nWriteDotOn} = \text{ncamouflage} \cdot (\text{nSmallDotOn}' \cdot \neg \text{nHiddenMark} + \text{nLargeDotOn} \cdot \text{nHiddenMark}) \quad (1)$$

The components of the expression are shown below.

ncamouflage: if an object pixel is a pixel that constitutes a camouflage pattern in a camouflage image, it assumes 0; if otherwise, 1.

nSmallDotOn: if the pixel value of the background threshold pattern is black, it assumes 1; if white, then 0 (color is not limited to this).

nLargeDotOn: if the pixel value of the foreground threshold pattern is black, it assumes 1; if white, then 0 (color is not limited to this).

nHiddenMark: if a target pixel in the basic image is a pixel that constitutes the latent image, it assumes 1; if a pixel that constitutes the background image, it assumes 0.

¬nHiddenMark: Negation of nHiddenMark. It assumes 0 in the foreground section; and 1 in the background section.

Incidentally, it is not necessary to calculate the expression (1) by using all compositions therein for each pixel to be processed. Omission of unnecessary calculation can enhance the speed of processing.

For example, if nHiddenMark=1, then ¬nHiddenMark=0, and if nHiddenmark=0, then ¬nHiddenMark=1. Therefore, it is good to assume a value of the following expression (2) as a value of nLargeDotOn if HiddenMark=1, and to assume a value of the expression (2) as a value of nSmallDotOn if nHiddenMark=0.

Moreover, since a value of nCamouflage is a multiplicand to the terms in a parenthesis as shown in the expression (1), if ncamouflage=0, then nWriteDotOn=0. Therefore, if ncamouflage=0, calculation of the expression (2) below can be omitted.

$$(\text{nSmallDotOn}' \cdot \neg \text{nHiddenMark} + \text{nLargeDotOn} \cdot \text{nHiddenMark}) \quad (2)$$

Furthermore, an image whose dimensions of length and breadth are least common multiples of lengths and breadths of the background threshold pattern, the foreground threshold pattern, the basic image, and the camouflage image, respectively. Therefore, the processing time for generating the tint block image can be shortened if the tint block processing section 205 generates only one portion of the tint block image that is the minimum unit of repetition and arranges that portion of the tint block image repeatedly to tile the tint block image area completely.

Next, in Step 2705, the CPU 1 determines the calculation result (a value of nWriteDotOn) in Step 2704. That is, if nWriteDotOn=1, the flow proceeds to Step 2706; if nWriteDotOn=0, the flow proceeds to Step 2707.

In Step 2706, a process of writing a pixel value corresponding to a dot at the time of printing is performed. Here, the pixel value is changeable according to a color of the tint block image. In addition, a color tint block image can be formed by setting the pixel values in conformity with colors of printer toners or inks. Moreover, secondary colors generated by combining a plurality of colors of the toners or inks.

It is determined whether all pixels in the area to be processed were processed in Step 2707. If all the pixels in the area to be processed are not processed, the flow proceeds to Step 2708, where unprocessed pixels are selected and processing in Steps 2704-2706 is performed again.

According to this embodiment, the user is allowed to select either watermark printing or superposition printing according to a blank area of the manuscript data, presence/absence of an area to be painted with a white image, the application having generated the manuscript data, etc. Therefore, the present invention makes the information processing apparatus easy to use for the user in terms of tint block printing.

Incidentally, a process of synthesizing a bit map image from the tint block image data and the manuscript image data is performed in the printer 1500. In the synthetic processing in the printer, if the superposition printing is set up, first the manuscript image data is rasterized onto bit map memory, and then the tint block image data is rasterized in such a way as to be written over the manuscript image data. At this time, if the tint block image data were simply written over it, the manuscript image would disappear. Then, in the case where the superposition printing is set up, the manuscript data is prevented from being overwritten with the tint block image by using logical drawing of AND/OR. For example, the following processing is performed: if a pixel of the bit map image obtained by spreading the manuscript image data has a value corresponding to white, the tint block image data corresponding to the pixel is written over the bit map memory corresponding to the said pixel position; and if a pixel has a value corresponding to non-white, the tint. block image data corresponding to the pixel is not written over it.

Several embodiments based on the system explained above of the configuration for printing the tint block image will be described below.

First Embodiment

Figure 20:
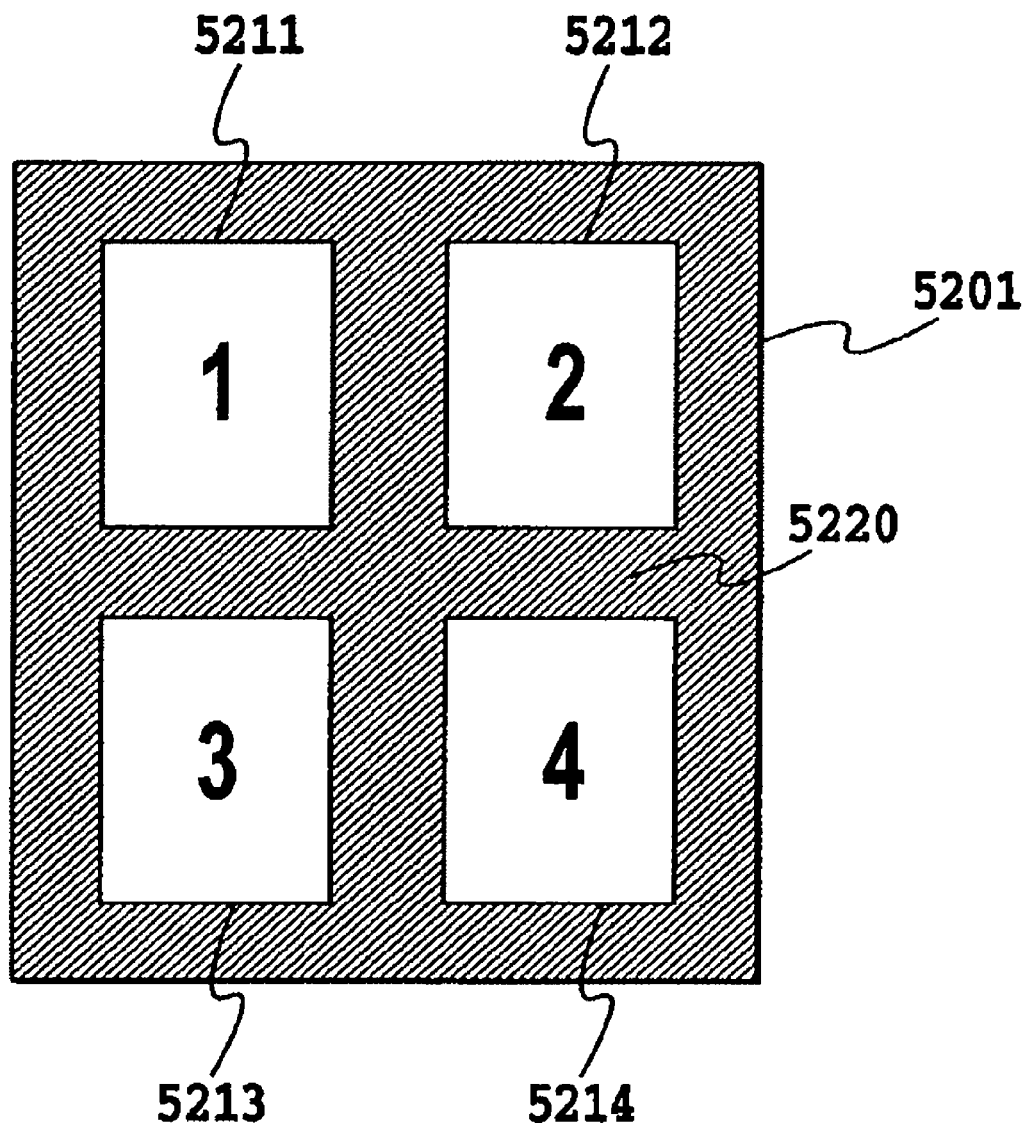
FIG. 20 is a view explaining tint block image printing according to a first embodiment of the present invention.

FIG. 20 is a view illustrating tint block image printing according to a first embodiment of the present invention, which relates to printing of the tint block image in the so-called N-up printing.

The example shown in FIG. 20 illustrates a case of performing N-up printing with N=4; the system is configured so that the tint block image is not printed in four print areas (hereinafter, each area is referred to as logical-page arrangement area) in printing paper (printing medium), but is printed in a blank area except these print areas.

To be concrete, reference numeral 5201 denotes a printable area (physical page) in printing paper when N-up printing is performed, and reference numerals 5211, 5212, 5213, and 5214 denote page arrangement areas (the logical-page arrangement areas) as print areas specified by a printing application, respectively. When the setting of such N-up printing exists in the spool description file (SDF), the despooler 305 (FIG. 3) divides a physical page into areas, and directs the graphic engine to perform printing by reducing and moving pages issued by the application onto respective areas thus divided.

Then, the tint block image is printed only in an area that is in this physical page and does not belong to any logical-page arrangement areas, i.e., the area 5220 shown in gray in FIG. 20.

Figure 21:
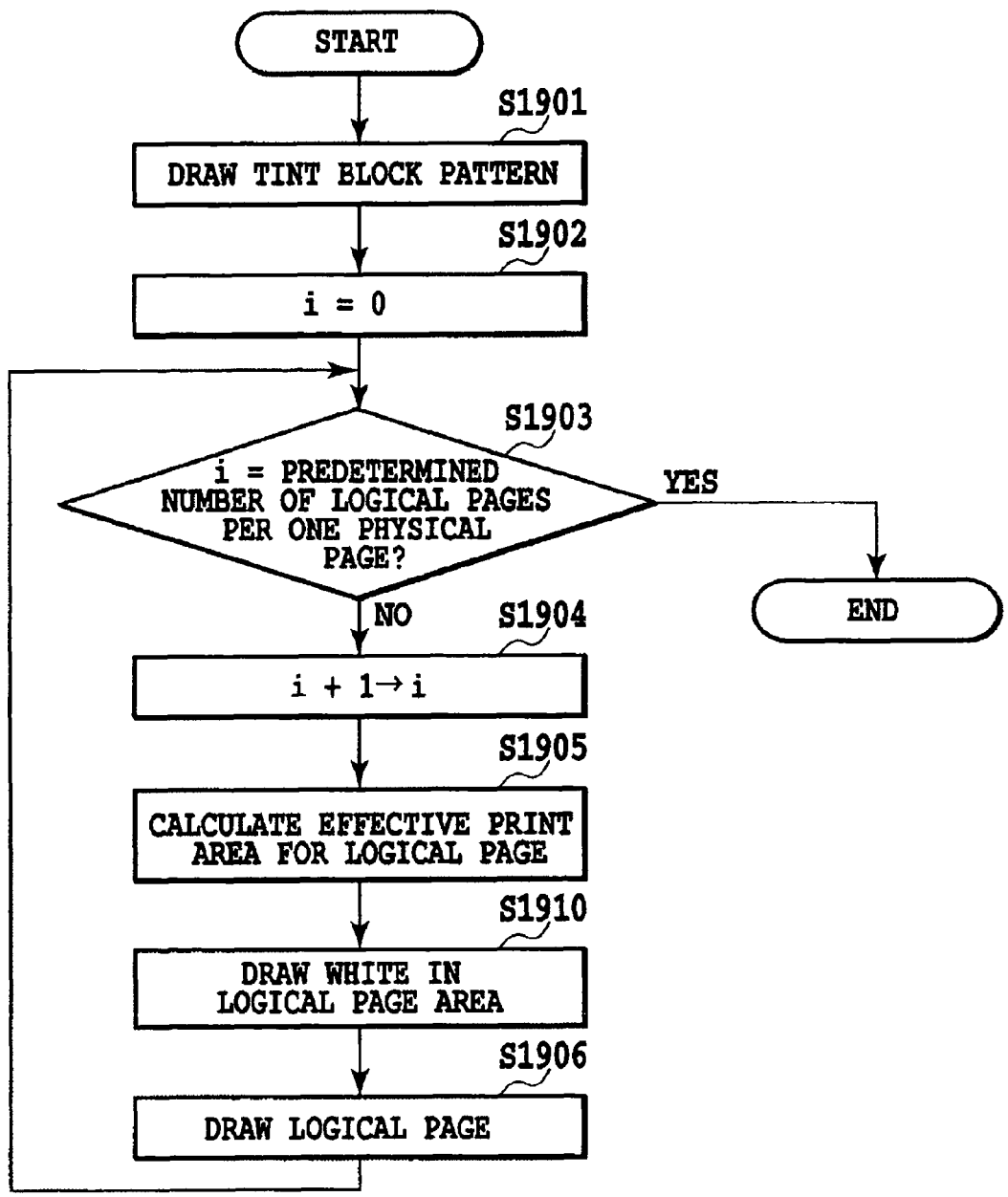
FIG. 21 is a flowchart showing a process of the tint block printing shown in FIG. 20.

FIG. 21 is a flowchart showing a process of the tint block image printing shown in FIG. 20. As shown in this figure, this process is based on the fundamental configuration of "water-mark printing" shown in FIG. 17, so that after "Calculation of effective printable area for logical-page arrangement area" in Step 1905, rendering an effective print area for the logical-page arrangement areas with blank in Step 1910, i.e., generation of drawing data such that pixel values in the areas become zero, and subsequently drawing in the logical-page arrangement areas is executed in Step 1906. More specifically, in Step 1910, a process of erasing the tint block image data that is drawn in Step 1901 and is laid out in the logical-page arrangement areas 5211, 5212, 5213, and 5214 is performed. Then, the printout image is drawn in these areas in subsequent Step 1906. As a result, the tint block image drawn in Step 1901 will be printed only in the blank area 5220. Note that FIG. 17 shows an example of "watermark printing" and FIG. 18 shows an example of "superposition printing" and that, since other objects are not printed in the area 5220 in which the tint block image is printed in this embodiment, the above-mentioned same processing should do in both "watermark printing" and "superposition printing."

Note that in this embodiment, although the print processing is explained by specifying a timing between drawing of the logical page data in the logical-page arrangement areas and deletion of the tint block image as described above, the present invention is not limited to the flow of processing like this and the timing only needs to be controlled in such a way that the tint block image is formed only in the blank area finally.

As described in the foregoing, according to the first embodiment of the present invention, by using a fact that a blank area results from the N-up printing, the tint block image is printed in the blank area. Thereby, whatever a printed image is, the tint block image can be printed in a position in which it does not interfere with the printed mage. And as a result, even when the density of the tint block image is close to the density of the printout image, a printout image can be recognized clearly, and degradation of the printed image that may result from the tint block printing can also be prevented. Moreover, although images printed in the logical pages as described above are inherently hard to recognize by the human eye because they are reduced in size, the first embodiment can prevent what is inherently hard for people to recognize from becoming harder to recognize by printing the tint block image in other areas.

Second Embodiment

A second embodiment of the present invention relates to a configuration that in the case of performing printing, such as the above-mentioned N-up printing, where there are a plurality of logical-page arrangement areas and blank areas other than these logical-page arrangement areas, the tint block image is also printed in the logical page arrangement areas and the tint block image is made different from the tint block image printed in the blank areas. More specifically, the tint block image printed in the logical-page arrangement areas is differentiated from the tint block image printed in the blank areas by changing characters, a pattern, etc., so that the image printed out in the logical-page arrangement areas is made recognizable.

Figure 16B:
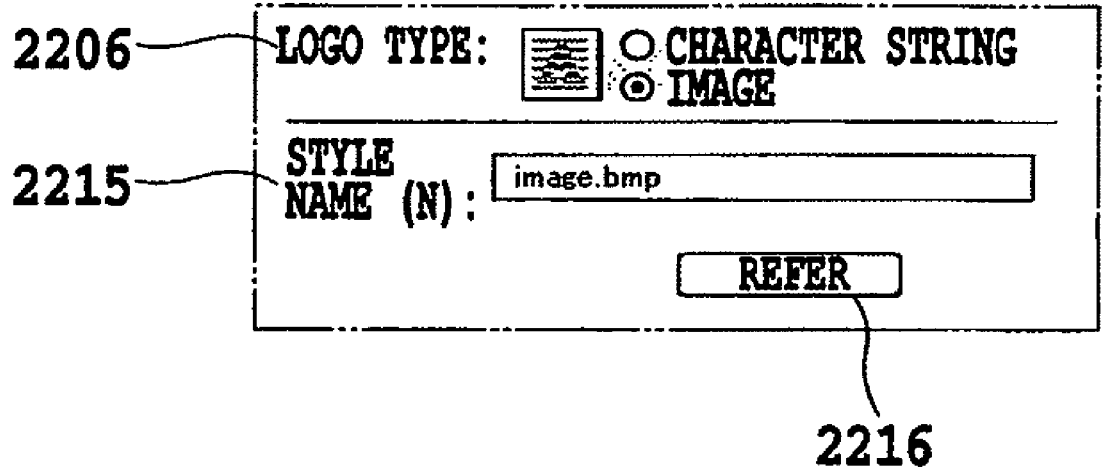

A concrete configuration therefore is such that the user interfaces shown in FIGS. 16A and 16B are changed, and the tint block setting for the physical pages and the tint block setting for the logical-page arrangement areas are kept separately in a data structure of the tint block printing shown in FIG. 14. Thereby, mutually different tint blocks can be printed in the physical pages (i.e., the above-mentioned blank area) and the logical-page arrangement areas, respectively.

Figure 22:
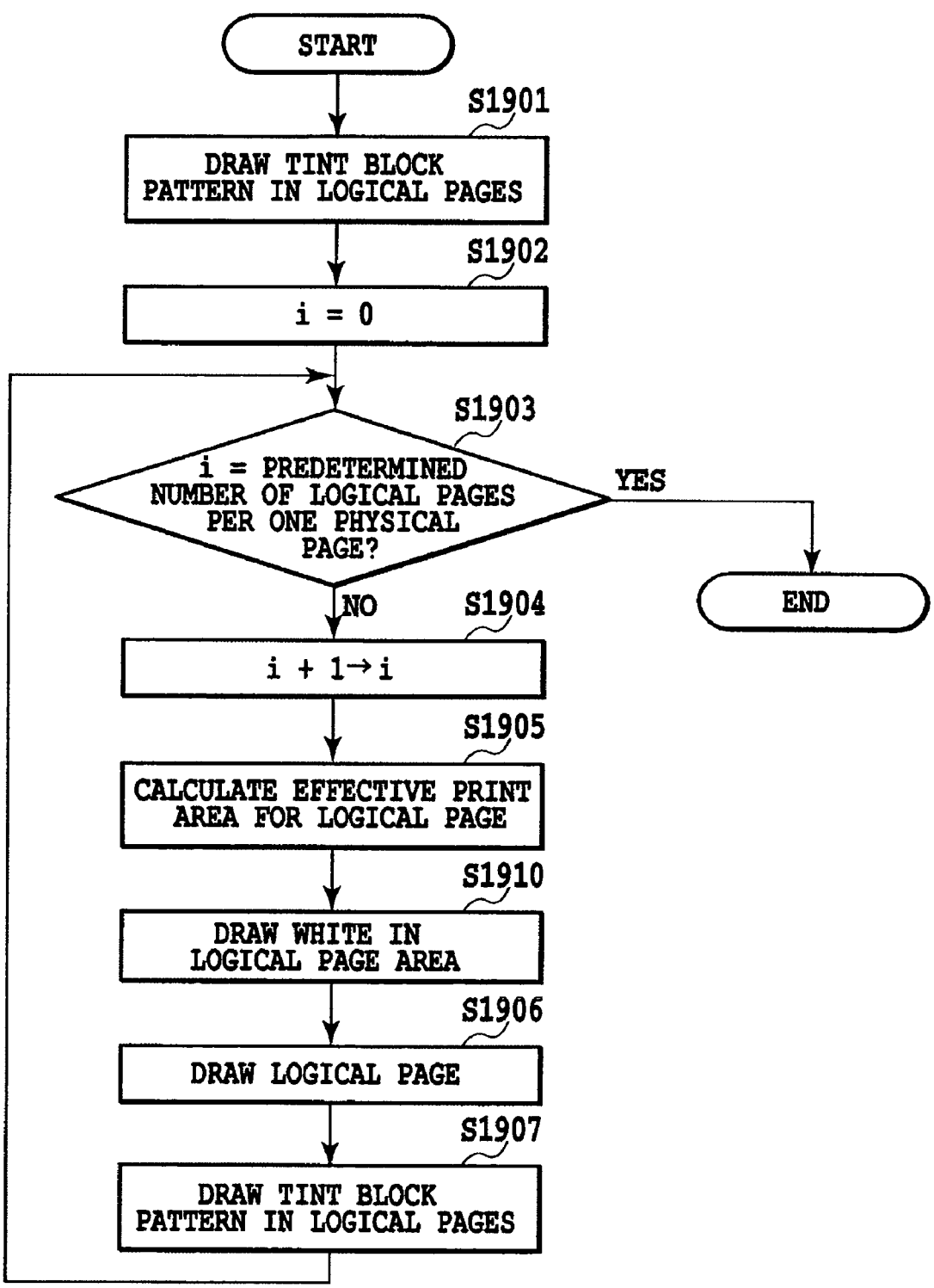
FIG. 22 is a flowchart showing processing of the second embodiment of the present invention in the case where "superposition printing" is specified in the second embodiment of the present invention.

FIG. 22 is a flowchart showing processing of this embodiment in the case that "superposition printing" is specified. It differs from the processing shown before in FIG. 21 in that after "Logical page drawing" in Step 1906, the tint block pattern for the logical-page arrangement areas is drawn in Step 1907.

The processing of this embodiment in the case that "watermark printing" is specified is as follows. This processing differs from the processing shown in FIG. 21 in that after deleting the tint block image from the logical-page arrangement areas in Step 1910, the tint block image that is different from the image in the blank area and that is other than blanked data (pixel value is zero) is drawn in the logical-page arrangement areas. After this, drawing in the logical-page arrangement areas is performed in Step 1906.

As described in the above, according to the second embodiment of the present invention, even when the density of the tint block image is close to the density of the printout image, the printout image can be recognized clearly. Besides, since the tint block image is printed also in the logical-page arrangement areas and consequently the tint block image is printed all over the physical page, a printed matter such that impression and appearance of the whole printed matter are further enhanced can be generated as compared to the first embodiment that has achieved the object of the present invention just by not forming the tint block image in the logical-page arrangement areas.

In this embodiment, the timing between the drawing of the logical page data for the logical-page arrangement areas and the deletion of the tint block image is explained as specified in the foregoing. However, the present invention is not limited to a processing flow like this, and the processing only needs to be controlled in such a way that mutually different tint block images are finally formed in the margin areas and the logical-page arrangement areas, respectively.

Third Embodiment

The third embodiment of the present invention relates to a configuration in which the density of the printout image is corrected so that the density becomes higher than the density of the tint block image by a certain value or more. More specifically, the configuration is such that a density range not used in the printing is determined in advance based on the densities of the latent image and the background image of the tint block as well as a density margin being set for each type of printer etc., the density of individual print object directed by the application is detected, and the density of the printed image is corrected so that the detected densities do not fall within the density range not used in the printing.

Figures 23A, 23B:
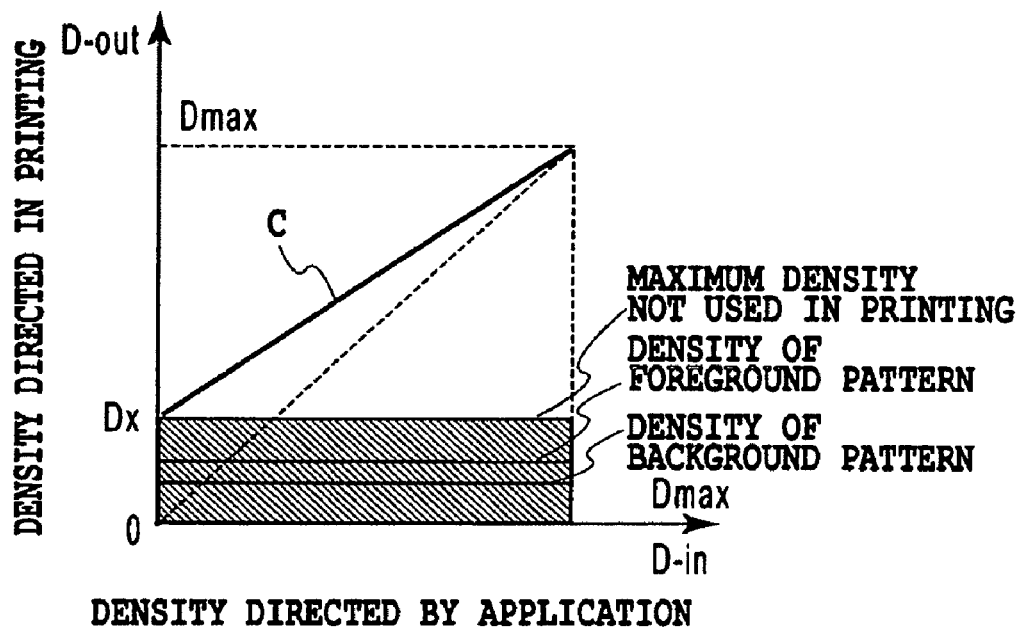
FIGS. 23A and 23B are views explaining one example of density compensation according to the third embodiment of the present invention.
Figure 24:
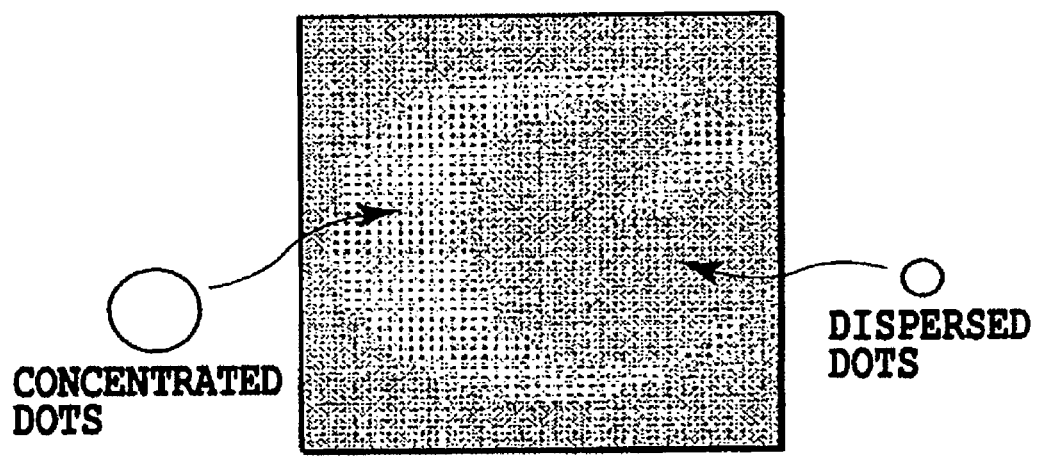
FIG. 24 is a view showing the latent image section and the background section that are two areas of the tint block image.
Figure 25A:
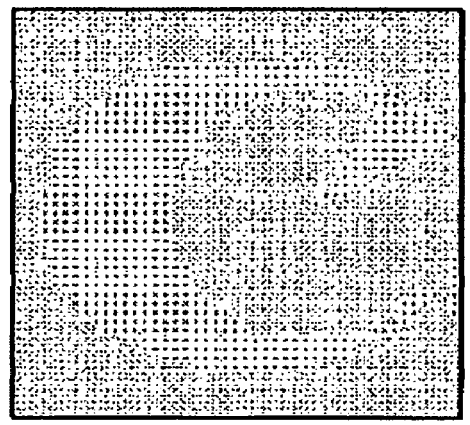
FIGS. 25A and 25B are views explaining a visualized image of the tint block image.
Figure 25B:
Figure 25B:
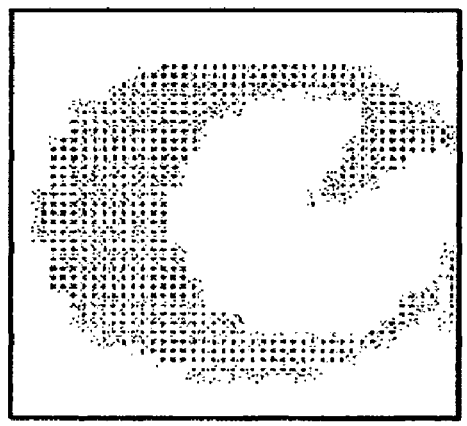
Figure 26A:
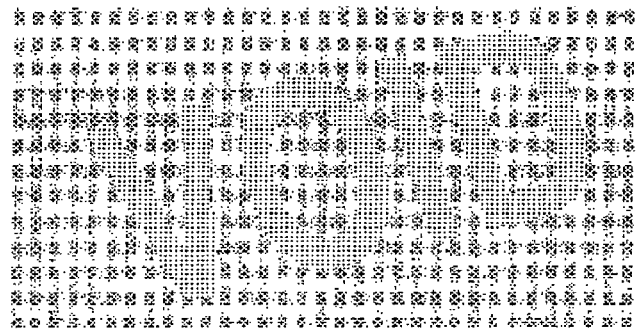
FIG. 26A and FIG. 26B are views each showing camouflage in the tint block image.
Figure 26B:
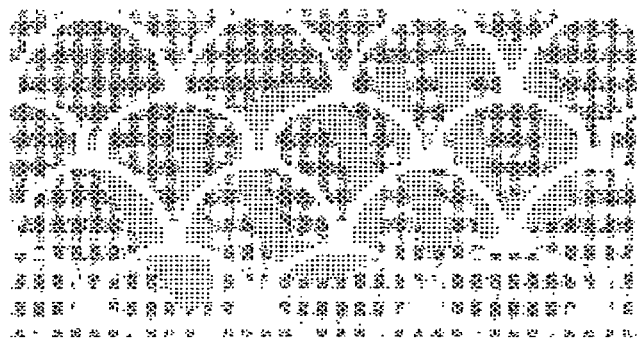

FIGS. 23A and 23B are diagrams explaining one example of this density correction.

Theoretically, the density of the latent image and the density of the background image become the same value, but actually they do not necessarily coincide with each other due to a characteristic and conditions of a printing device. As shown in FIGS. 23A and 23B, the density (Df) of the latent image (foreground pattern) is 23, and the density (Db) of the background image (background pattern) is 20 in the illustrated example. In order to enhance the density of the printout image (print object) by a certain value or more to these densities, a density margin (Dm) is set. In the illustrated example, this value is set to 13. Note that since this density margin varies due to factors, such as a type of an output device and its conditions, for example, this value may be made different for each device, and made different after the elapse of a constant period for the same device.

Then, once the density margin is set, the maximum density (Dx) of the density range not used in printing is calculated by the following formula:

$$Dx = \max(Df, Db) + Dm,$$

where $\max(Df, Db)$ means a larger value of Df and Db. In the illustrated example, Dx is found 36. Then, printing is performed in such a way that the density falls within densities ranging from this maximum density (Dx) to the maximum density (Dmax). To be concrete, the following intensity compensation is performed.

The density (D-out) directed in performing printing that is based on the density of an object (D-in) directed by the application is calculated by the following formula. That is, correction of "the density directed by the application," which is indicated by the straight line c shown in FIG. 23B, is performed by the following formula.

$$D\text{-out} = (Dmax - Dx)/Dmax \cdot D\text{-in} + Dx$$

To be concrete, the density correction stated above can be performed by the despooler 305 and will be able to be reflected in printing. Naturally, the same correction may be performed by the previewer 306, the setting change editor 307, or the like, being applied to an image outputted on the screen.

Incidentally, if the density (D-in) of an object directed from the application is higher than the maximum density Dx being set using the density margin, the object is printed, as with the original density, without performing such correction as described above.

According to the above embodiment, since the density of the image printed out is enhanced by a certain value or more to the tint block image, the density of the printed image is prevented from becoming close to that of the tint block image, facilitating identification of the printed image. Moreover, the embodiment can prevent degradation in the printed image, such as blurring of image outlines, resulting from its close density to the tint block image. Incidentally, even if an image to be printed is a gray-scale image, the original gradation maybe almost retained by compensating densities of the printed image according to the above formula.

Other Embodiments

An embodiment that combines the above-mentioned second embodiment and third embodiment is also feasible. That is, naturally the density margin can be set for the latent image density and the background density of the tint block image printed in the logical pages.

In addition, although the first and second embodiments mentioned above are explained by taking the so-called N-up printing as examples, it is evident from the description above that the present invention can be applied to a printing style such that printing areas and blank areas other than the printing areas are produced in the printable area as in the case of, for example, mere reduction printing.

Further Another Embodiment

Incidentally, the present invention may be applied to a system comprising two or more pieces of equipment (for example, host computer, interface device, reader, printer, etc.), and to equipment consisting of a single device (copying machine, printer, facsimile apparatus, etc.).

In addition, the object of the present invention is also achieved by allowing a computer in a system or equipment (or CPU, or MPU) to read and execute program code stored in a storage medium for storing program code that executes procedures of the flowcharts realizing the above-mentioned functions of the embodiment and being shown in the figures.

In this case, the program code itself read from the storage medium will realize the above-mentioned functions of the embodiments, and consequently the storage medium storing the program code constitutes the present invention.

As storage media for providing the program code, there can be used, for example, a floppy (registered trademark) disk, a hard disk, an optical disk, a magneto-optical disk, CD-ROM, CD-R, magnetic tape, a nonvolatile memory card, ROM, etc.

Moreover, the present invention includes not only a case where the above-mentioned functions of the embodiments are realized by a computer executing read program code, but also a case where the OS (Operating System) working on a computer executes a part or the whole of actual processing based on instructions of the program code, by which processing the above-mentioned functions of the embodiments are realized.

Furthermore, the present invention also includes a case where the program code read from the storage medium is written into memory possessed by a function expansion board loaded into a computer or by a function expansion section connected to a computer, and subsequently, based on instructions of the program code, a CPU possessed by the function expansion board or by the function expansion section or etc. executes a part or the whole of actual processing, by which processing the above-mentioned functions of the embodiment are realized.

The present invention has been described in detail with respect to preferred embodiments, and it will now be apparent from the foregoing to those skilled in the art that changes and modifications may be made without departing from the invention in its broader aspect, and it is the intention, therefore, in the apparent claims to cover all such changes and modifications as fall within the true spirit of the invention.

This application claims priority from Japanese Patent Application No. 2003-352982 filed Oct. 10, 2003, which is hereby incorporated by reference herein.

What is claimed is:

1. An apparatus for correcting a density of an object, comprising:
   a correcting unit which corrects the density of the object in the case that the object is combined with an image including two areas, one of the two areas remaining recognizable as compared to the other area in a copy; and
   a combining unit which combines the object and the image including the two areas to generate a combined image,
   wherein a density of the combined image is higher than a density of the image including the two areas.

2. An apparatus as claimed in claim 1, wherein said correcting means corrects the density of the object so that a gradation of the object is retained in a printed image which is made by printing the combined image.

3. An apparatus as claimed in claim 2, wherein said correcting means corrects the density of the object so that a gradation of the printed image is expressed in a density range that is higher than the density of the image including the two areas in the printed image and is equal to or lower than a predetermined maximum density.

4. An apparatus as claimed in claim 1, wherein said correcting means corrects the density of the object so that a gradation of a printed image, which is made by printing the combined image, is expressed in a density range that is equal to or higher than a predetermined density that is higher than the density of the image including the two areas in the printed image and is equal to or lower than a maximum density.

5. A density correction method for an object, comprising:
   a correcting step of correcting the density of the object in the case that the object is combined with an image including two areas, one of the two areas remaining recognizable as compared to the other area in a copy; and
   a combining step of combining the object and the image including the two areas to generate a combined image,
   wherein a density of the combined image is higher than a density of the image including the two areas.

6. A density correction method as claimed in claim 5, wherein said correcting step corrects the density of the object so that a gradation of the object is retained in a printed image which is made by printing the combined image.

7. A density correction method as claimed in claim 6, wherein said correcting step corrects the density of the object so that a gradation of the printed image is expressed in a density range that is higher than the density of the image including the two areas in the printed image and is equal to or lower than a predetermined maximum density.

8. A density correction method as claimed in claim 5, wherein said correcting step corrects the density of the object so that a gradation of a printed image, which is made by printing the combined image, is expressed in a density range that is equal to or higher than a predetermined density that is higher than the density of the image including the two areas in the printed image and is equal to or lower than a maximum density.

9. A non-transitory computer-readable storage medium storing a computer program for making a computer perform density correction of an object, the computer program comprising:
   a correcting step of correcting the density of the object in the case that the object is combined with an image including two areas, one of the two areas remaining recognizable as compared to the other image in a copy; and
   a combining step of combining the object and the image including the two areas to generate a combined image,
   wherein a density of the combined image is higher than a density of the image including the two areas.

10. A non-transitory computer-readable storage medium storing a computer-executable program for making a computer perform density correction of an object as claimed in claim 9, wherein said correcting step corrects the density of the object so that a gradation of the object is retained in a printed image which is made by printing the combined image.

11. A non-transitory computer-readable storage medium storing a computer-executable program for making a computer perform density correction of an object as claimed in claim 10, wherein said correcting step corrects the density of the object so that a gradation of the printed image is expressed in a density range that is higher than the density of the image including the two areas in the printed image and is equal to or lower than a predetermined maximum density.

12. A non-transitory computer-readable storage medium storing a computer-executable program for making a computer perform density correction of an object as claimed in claim 9, wherein said correcting step corrects the density of the object so that a gradation of a printed image, which is made by printing the combined image, is expressed in a density range that is equal to or higher than a predetermined density that is higher than the density of tint block image in the printed image and is equal to or lower than a maximum density.

13. A non-transitory computer-readable storage medium storing a computer-executable program for making a computer perform density correction of an object as claimed in claim 9, wherein said correcting step calculates the density of the object based on an expression (the maximum density minus the predetermined density higher than the density of tint block image) times the density of the object, for correcting the density of the object.

* * * * *